(12) United States Patent
Shimizu et al.

(10) Patent No.: US 11,018,896 B2
(45) Date of Patent: May 25, 2021

(54) INFORMATION PROCESSING APPARATUS AND INFORMATION PROCESSING METHOD

(71) Applicant: FUJITSU LIMITED, Kawasaki (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 16/368,864

(22) Filed: Mar. 29, 2019

(65) Prior Publication Data

US 2019/0229949 A1 Jul. 25, 2019

Related U.S. Application Data

(63) Continuation of application No. PCT/JP2018/004367, filed on Feb. 8, 2018.

(30) Foreign Application Priority Data

Apr. 26, 2017 (JP) .............................. JP2017-086962

(51) Int. Cl.
*H04L 12/44* (2006.01)
*H04L 12/24* (2006.01)
(Continued)

(52) U.S. Cl.
CPC ............ *H04L 12/44* (2013.01); *G06F 15/173* (2013.01); *H04L 12/462* (2013.01); *H04L 41/12* (2013.01)

(58) Field of Classification Search
None
See application file for complete search history.

(56) References Cited

U.S. PATENT DOCUMENTS

2009/0307467 A1 12/2009 Faraj
2010/0185718 A1* 7/2010 Archer .................. G06F 9/4856
709/201
(Continued)

FOREIGN PATENT DOCUMENTS

JP 11-110362 A 4/1999
JP 2015-232874 A 12/2015
(Continued)

OTHER PUBLICATIONS

International Search Report dated Apr. 3, 2018 for PCT/JP2018/004367 filed on Feb. 8, 2018, 6 pages including English Translation.

*Primary Examiner* — Kodzovi Acolatse
*Assistant Examiner* — The Hy Nguyen
(74) *Attorney, Agent, or Firm* — Xsensus LLP

(57) ABSTRACT

An information processing apparatus includes a memory and a processor coupled to the memory. The processor performs first all-reduce communication with another information processing apparatus coupled to a first leaf switch coupled to the information processing apparatus, performs second all-reduce communication with one information processing apparatus coupled to a second leaf switch included in the same layer as the first leaf switch and third all-reduce communication with one information processing apparatus coupled to a third leaf switch which is coupled to a spine switch coupled to the first leaf switch included in a layer different from the layer including the first leaf switch, using a result of the first all-reduce communication, and transmits a result of a process of the second all-reduce communication and the third all-reduce communication to the another information processing apparatus coupled to the first leaf switch.

9 Claims, 27 Drawing Sheets

(51) Int. Cl.
*H04L 12/46* (2006.01)
*G06F 15/173* (2006.01)

(56) References Cited

U.S. PATENT DOCUMENTS

| | | | |
|---|---|---|---|
| 2013/0151713 A1* | 6/2013 | Faraj | H04L 67/14 709/227 |
| 2013/0290223 A1* | 10/2013 | Chapelle | G06N 20/00 706/12 |
| 2015/0215379 A1 | 7/2015 | Tamano | |
| 2015/0334035 A1* | 11/2015 | Miwa | H04L 65/4076 370/390 |
| 2016/0301565 A1* | 10/2016 | Zahid | H04L 41/044 |
| 2016/0352824 A1 | 12/2016 | Miwa et al. | |

FOREIGN PATENT DOCUMENTS

| | | |
|---|---|---|
| JP | 2016-224756 A | 12/2016 |
| WO | 2014/020959 A1 | 2/2014 |

\* cited by examiner

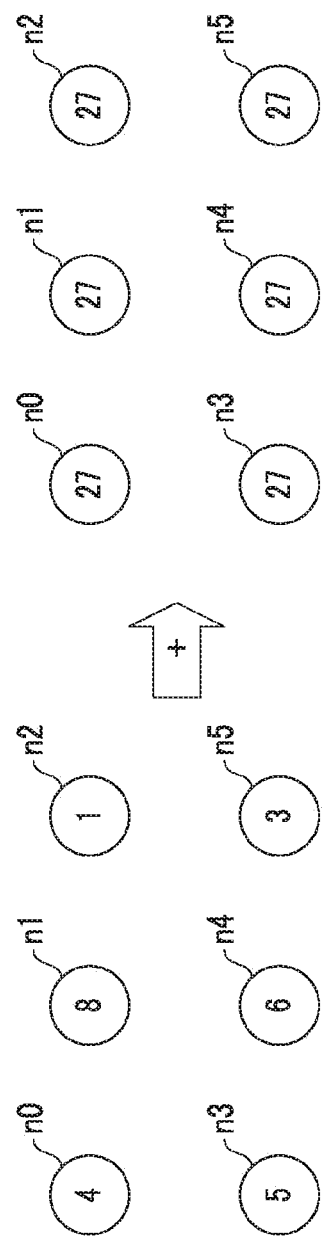

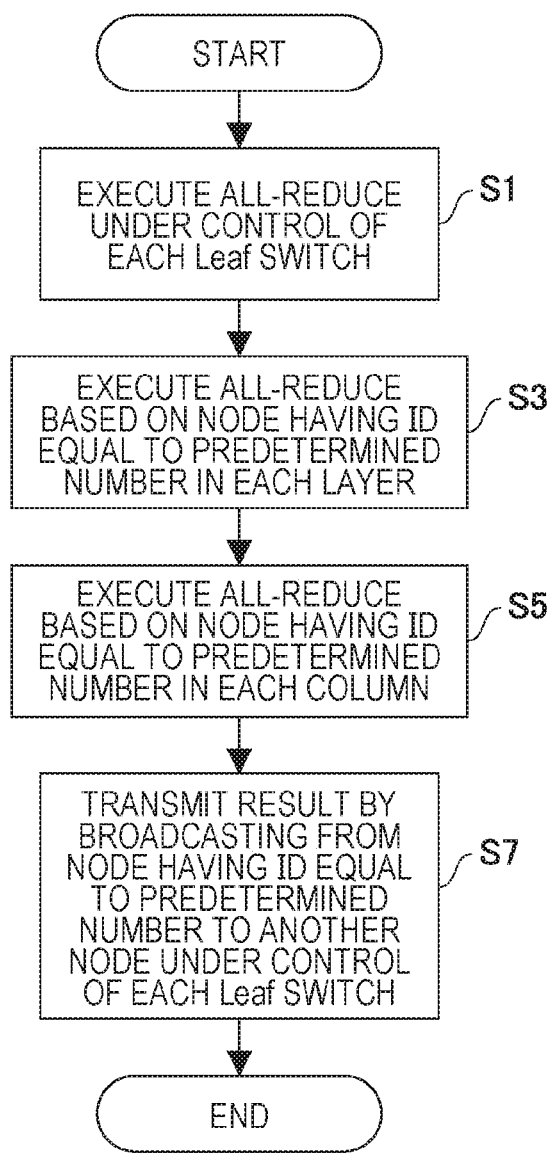

□ : Leaf SWITCH

▨ : Spine SWITCH

◯ : NODE

FIG. 23

| PHASE NUMBER | COMMUNICATION 1 | COMMUNICATION 2 |
|---|---|---|
| 1 | (4,5) | |
| 2 | (1,2) | (3,4) |
| 3 | (1,3) | (2,4) |
| 4 | 4→5 | |

INFORMATION PROCESSING APPARATUS AND INFORMATION PROCESSING METHOD

CROSS-REFERENCE TO RELATED APPLICATION

This application is a continuation application of International Application PCT/JP2018/004367 filed on Feb. 8, 2018 and designated the U.S., the entire contents of which are incorporated herein by reference. The International Application PCT/JP2018/004367 is based upon and claims the benefit of priority of the prior Japanese Patent Application No. 2017-086962, filed on Apr. 26, 2017, the entire contents of which are incorporated herein by reference.

FIELD

The embodiments discussed herein are related to an information processing apparatus and an information processing method.

BACKGROUND

In order to increase the throughput of a parallel distributed process executed by a parallel computer, it is important to efficiently perform communication in the parallel computer by optimizing the connection form of nodes and switches (for example, a network topology). In addition, in a case where the network topology is optimized to connect more nodes with fewer switches, the construction cost of the parallel computer may be reduced.

A certain document discloses a system (hereinafter, referred to as a multilayer full mesh system) employing a multilayer full mesh topology that is a topology capable of connecting more nodes than a fat tree topology even with the same number of switches.

However, in the multilayer full mesh system, there are fewer routes for efficient communication. Thus, route contention is likely to occur. While the above document discloses a method for avoiding the route contention at the time of executing all-to-all communication, a method for avoiding the route contention at the time of executing all-reduce communication is not considered.

The relating technology is disclosed in Japanese Laid-open Patent Publication No. 2015-232874.

SUMMARY

According to an aspect of the embodiments, an information processing apparatus includes a memory and a processor coupled to the memory. The processor performs first all-reduce communication with another information processing apparatus coupled to a first leaf switch coupled to the information processing apparatus, performs second all-reduce communication with one information processing apparatus coupled to a second leaf switch included in the same layer as the first leaf switch and third all-reduce communication with one information processing apparatus coupled to a third leaf switch which is coupled to a spine switch coupled to the first leaf switch included in a layer different from the layer including the first leaf switch, using a result of the first all-reduce communication, and transmits a result of a process of the second all-reduce communication and the third all-reduce communication to the another information processing apparatus coupled to the first leaf switch.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 1 is a diagram for describing all-reduce communication;

FIG. 11 is a diagram illustrating a process flow of a process executed by a multilayer full mesh system of the first embodiment as a whole;

FIG. 23 is a diagram illustrating one example of the communication table;

DESCRIPTION OF EMBODIMENTS

First Embodiment

First, all-reduce communication will be described.

FIG. 1 to FIG. 4B are diagrams for describing the all-reduce communication. The all-reduce communication refers to communication for all target nodes to have the result of an operation executed using the data of all target nodes. All-reduce refers to the operation. For example, in FIG. 1, a node n0 has a value "4". A node n1 has a value "8". A node n2 has a value "1". A node n3 has a value "5". A node n4 has a value "6". A node n5 has a value "3". In a case where the operation specified in the all-reduce is "addition", each of the nodes n0 to n5 has a value "27".

Figure 2A:
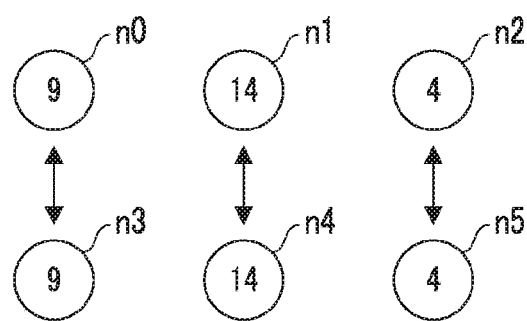
FIGS. 2A and 2B are diagrams for describing all-reduce communication.

For example, the all-reduce communication for implementing a state illustrated on the right side of FIG. 1 is performed as illustrated in FIG. 2A to FIG. 3B. First, as illustrated in FIG. 2A, a value "9" is calculated by addition between the node n0 and the node n3 by sharing their values. A value "14" is calculated by addition between the node n1 and the node n4 by sharing their values. A value "4" is calculated by addition between the node n2 and the node n5 by sharing their values.

Figure 2B:
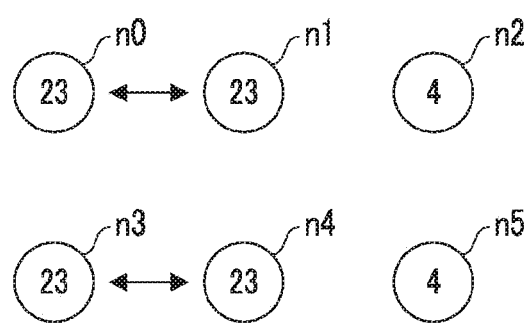

Then, as illustrated in FIG. 2B, a value "23" is calculated by addition between the node n0 and the node n1 by sharing their values. A value "23" is calculated by addition between the node n3 and the node n4 by sharing their values.

Figure 3A:
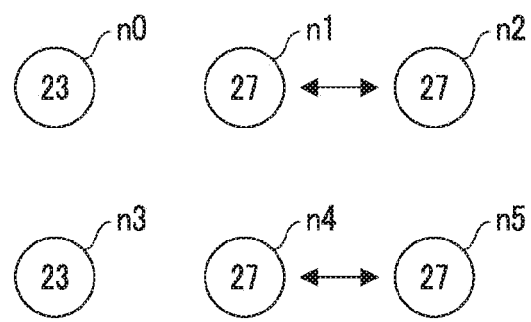
FIGS. 3A and 3B are diagrams for describing all-reduce communication.

Then, as illustrated in FIG. 3A, a value "27" is calculated by addition between the node n1 and the node n2 by sharing their values. A value "27" is calculated by addition between the node n4 and the node n5 by sharing their values.

Figure 3B:
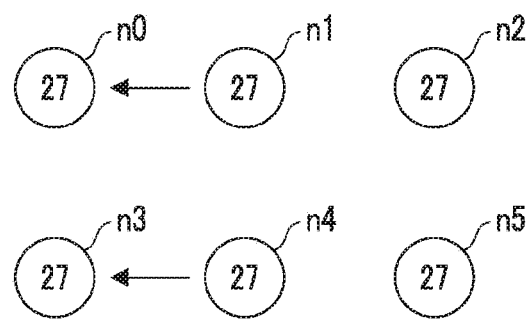

Last, as illustrated in FIG. 3B, the node n1 transmits the value "27" to the node n0, and the node n4 transmits the value "27" to the node n3. Accordingly, as illustrated in FIG. 3B, the nodes n0 to n5 may have the value "27".

Figure 4A:
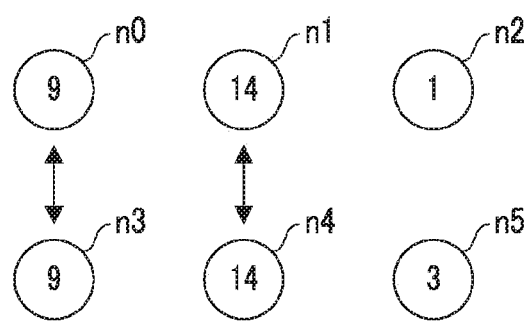
FIGS. 4A and 4B are diagrams for describing all-reduce communication.

Not all of the nodes n0 to n5 may be a target. A part of nodes among the nodes n0 to n5 may be a target. The all-reduce communication in a case where the nodes n0, n1, n3, and n4 are set as a target will be described as one example. First, as illustrated in FIG. 4A, a value "9" is calculated by addition between the node n0 and the node n3 by sharing their values. A value "14" is calculated by addition between the node n1 and the node n4 by sharing their values.

Figure 4B:
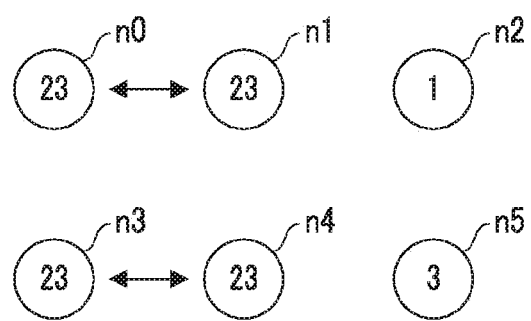

Then, as illustrated in FIG. 4B, a value "23" is calculated by addition between the node n0 and the node n1 by sharing their values. A value "23" is calculated by addition between the node n3 and the node n4 by sharing their values. Accordingly, the nodes n0, n1, n3, and n4 may have the value "23".

Figure 5:
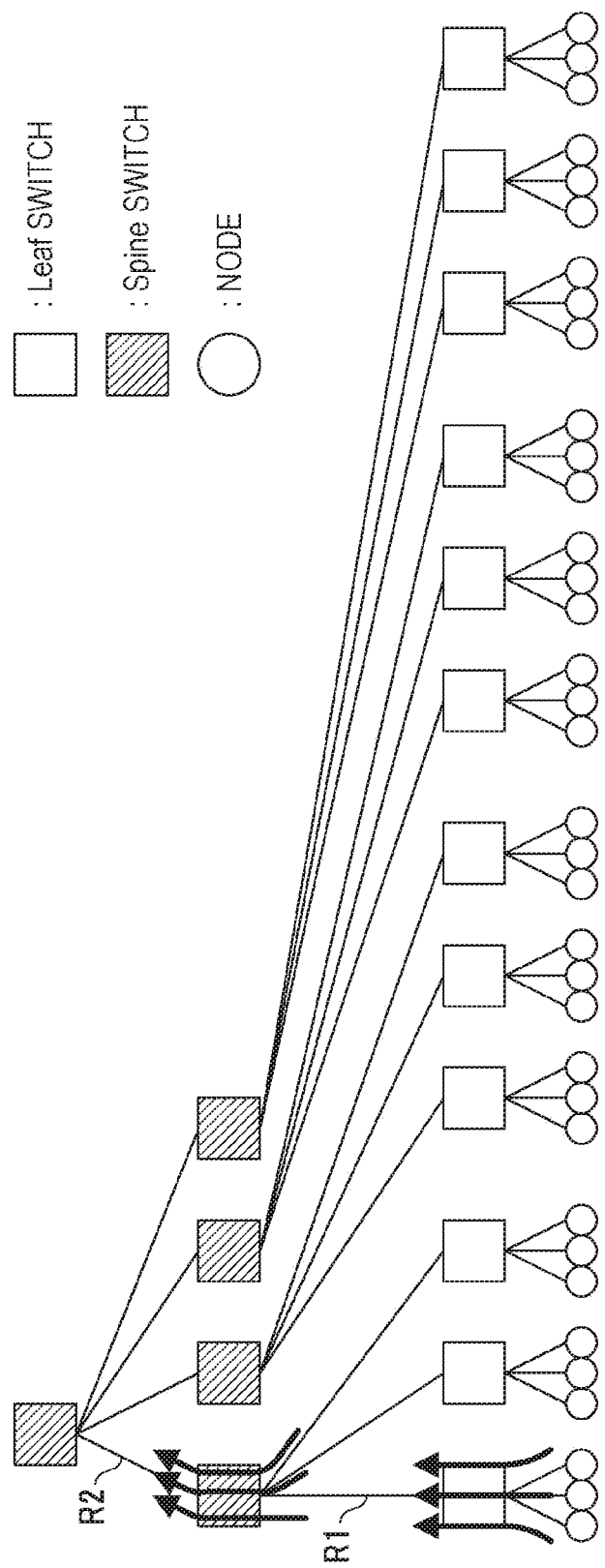
FIG. 5 is a diagram illustrating route contention in a case where all-reduce communication is executed in a topology of a normal tree structure.
Figure 6:
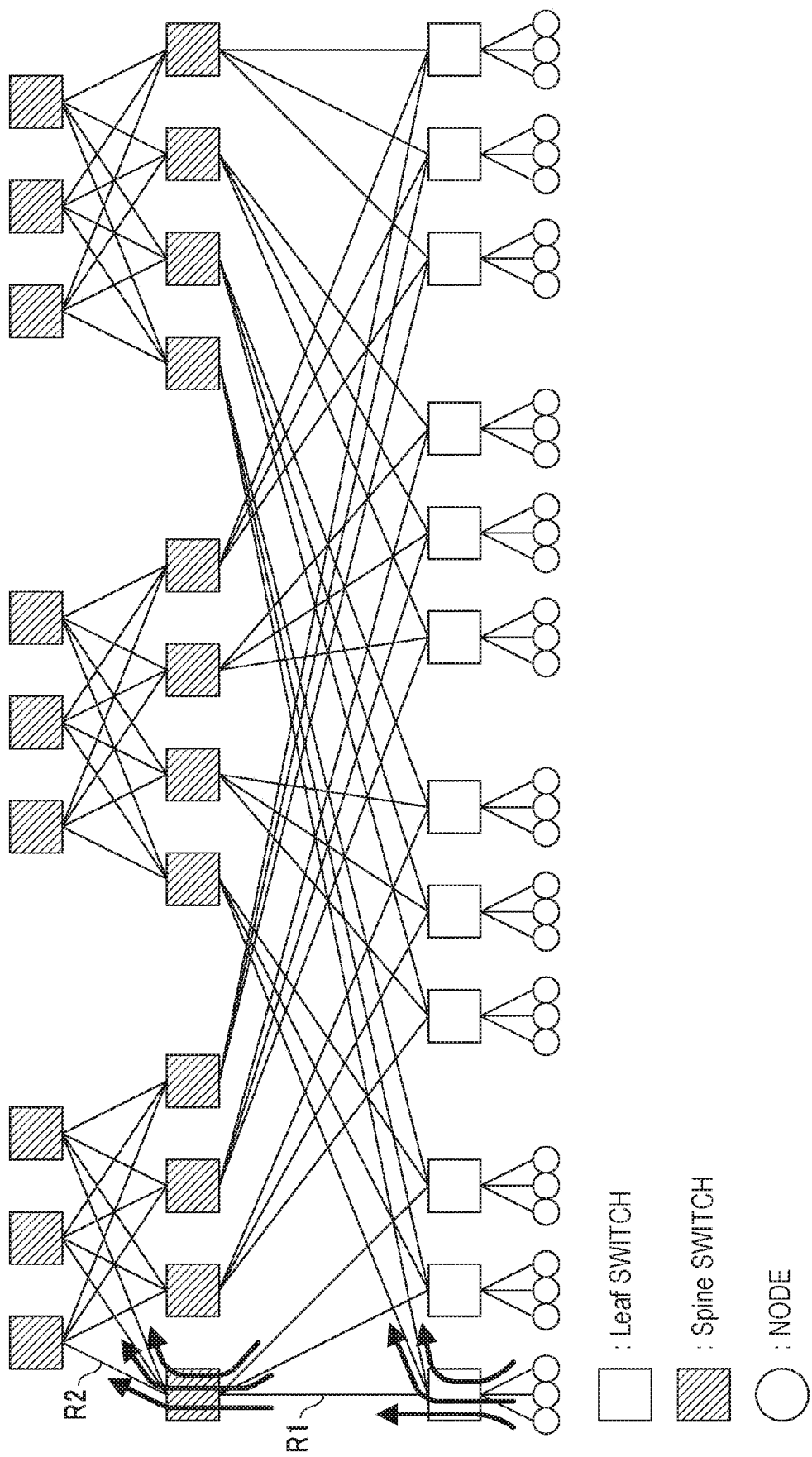
FIG. 6 is a diagram illustrating route contention in the case of execution in a topology of a fat tree structure.

Below, a way of causing route contention not to occur in the case of executing such all-reduce communication in a multilayer full mesh system is considered. The route contention means that a plurality of packets are transmitted at the same time in the same direction of one route. The route contention in a case where the all-reduce communication is executed in a topology of a normal tree structure is illustrated in FIG. 5 as an example. In FIG. 5, a circle represents a node. A square that is not hatched represents a Leaf switch. A square that is hatched represents a Spine switch. In FIG. 5, the route contention occurs in a route R1, and the route contention also occurs in a route R2. In such a case, for example, as illustrated in FIG. 6, the route contention may be avoided by changing the tree structure to a fat tree structure. However, the total number of switches is increased from that in the example in FIG. 5.

Figure 7:
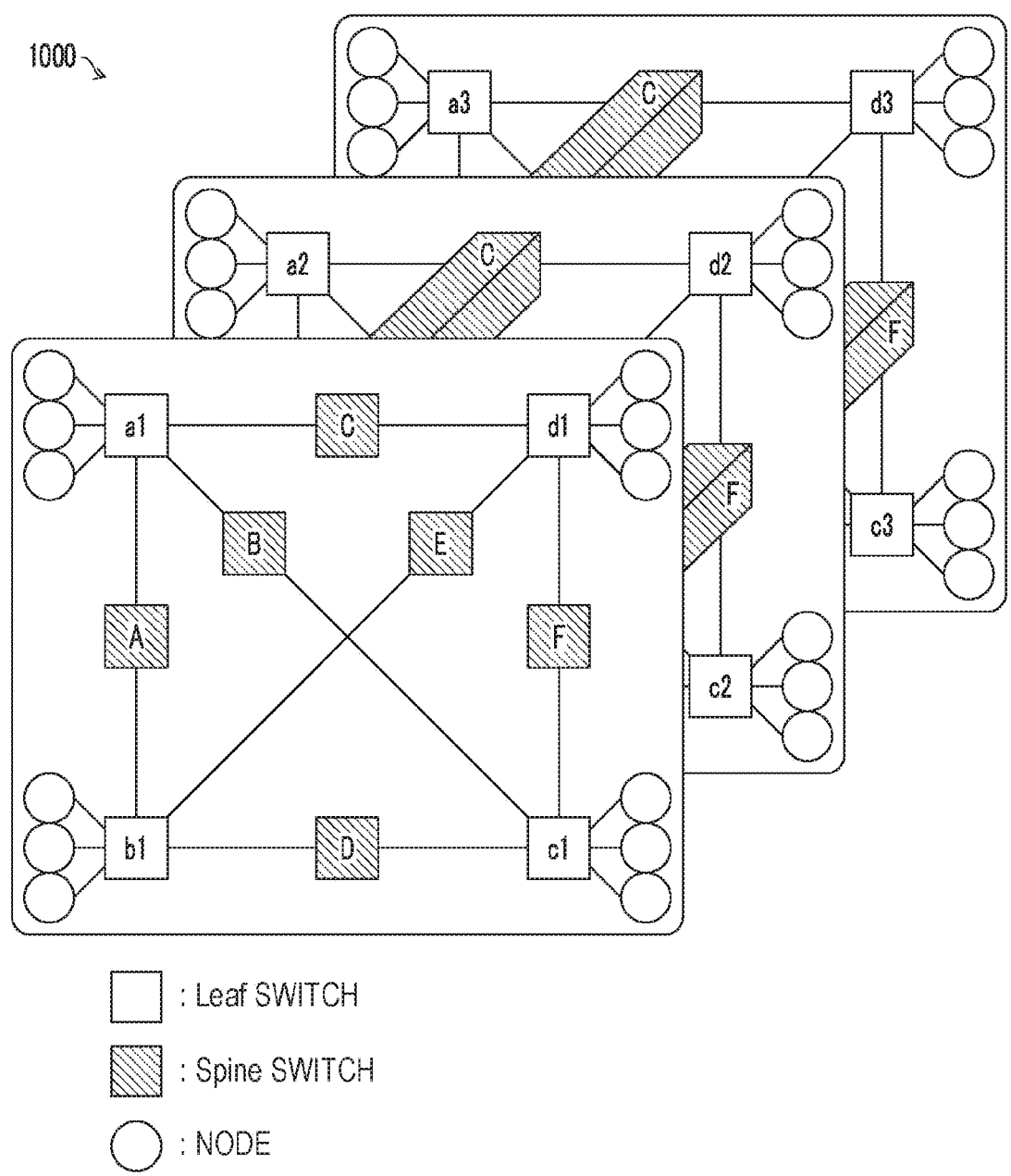
FIG. 7 is a diagram illustrating a multilayer full mesh system of the present embodiment.

FIG. 7 is a diagram illustrating a multilayer full mesh system 1000 of the present embodiment. In the example in FIG. 7, the number of ports is six in the Leaf switch and the Spine switch. The number of layers is three. The multilayer full mesh system 1000 includes 36 nodes. The number of ports in the Leaf switch and the Spine switch, the number of layers, and the number of nodes are not limited to those in the example illustrated in FIG. 7.

A Spine switch A is coupled to a Leaf switch a1, a Leaf switch b1, a Leaf switch a2, a Leaf switch b2, a Leaf switch a3, and a Leaf switch b3.

A Spine switch B is coupled to the Leaf switch a1, a Leaf switch c1, the Leaf switch a2, a Leaf switch c2, the Leaf switch a3, and a Leaf switch c3.

A Spine switch C is coupled to the Leaf switch a1, a Leaf switch d1, the Leaf switch a2, a Leaf switch d2, the Leaf switch a3, and a Leaf switch d3.

A Spine switch D is coupled to the Leaf switch b1, the Leaf switch c1, the Leaf switch b2, the Leaf switch c2, the Leaf switch b3, and the Leaf switch c3.

A Spine switch E is coupled to the Leaf switch b1, the Leaf switch d1, the Leaf switch b2, the Leaf switch d2, the Leaf switch b3, and the Leaf switch d3.

A Spine switch F is coupled to the Leaf switch c1, the Leaf switch d1, the Leaf switch c2, the Leaf switch d2, the Leaf switch c3, and the Leaf switch d3.

Three nodes are coupled to each Leaf switch.

Each node is an information processing apparatus that performs communication using a communication library such as the message passing interface (MPI).

Figure 8:
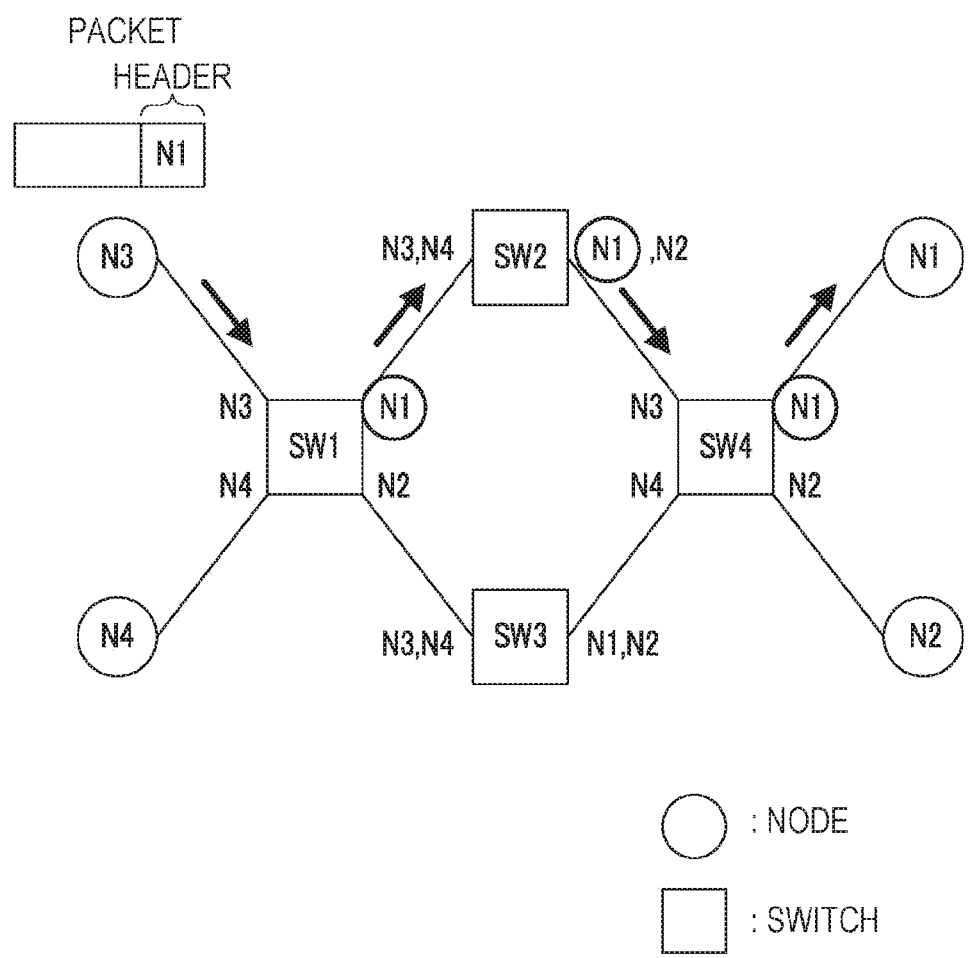
FIG. 8 is a diagram for describing routing in an InfiniBand network.

In the present embodiment, an InfiniBand network in which regular and fixed routing is performed is used for avoiding the route contention. Routing in the InfiniBand network will be described using FIG. 8. In FIG. 8, a circle represents a node, and a square represents a network switch. A line segment represents an InfiniBand link, and a numerical value near the line segment represents identification information related to a recipient node. A bold solid arrow represents a communication route.

In FIG. 8, a node N3 transmits a packet of which the recipient is a node N1. The header of the packet includes recipient identification information (for example, a local identifier (LID)). Each output port in each network switch is associated with the identification information related to the recipient node. Thus, each network switch outputs the packet to the output port corresponding to the recipient identification information included in the packet. In the example in FIG. 8, the packet reaches the node N1 through a network switch SW1, a network switch SW2, and a network switch SW4.

For example, the network of the present embodiment is not a network in which the route is automatically decided like Ethernet (registered trademark), and is a network in which regular and fixed routing is performed.

Figure 9:
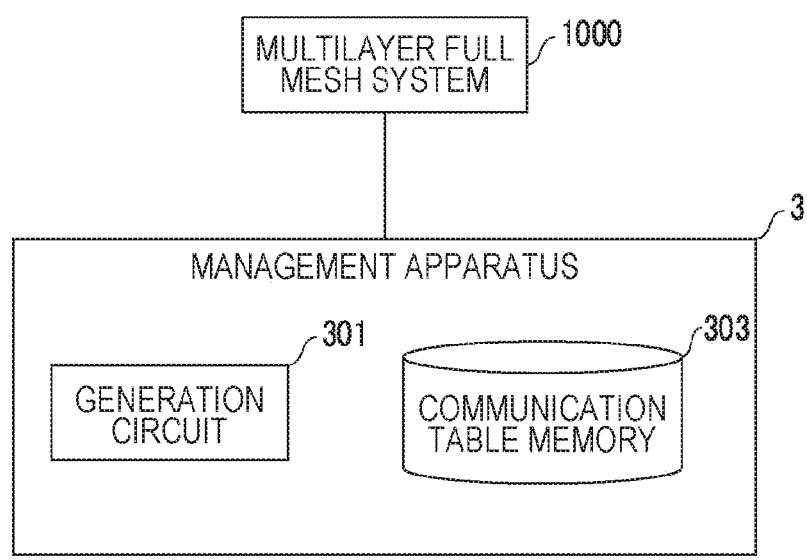
FIG. 9 is a function block diagram of a management apparatus coupled to the multilayer full mesh system.

FIG. 9 is a function block diagram of a management apparatus 3 coupled to the multilayer full mesh system 1000. The management apparatus 3 includes a generation circuit 301 and a communication table memory 303.

Figure 28:
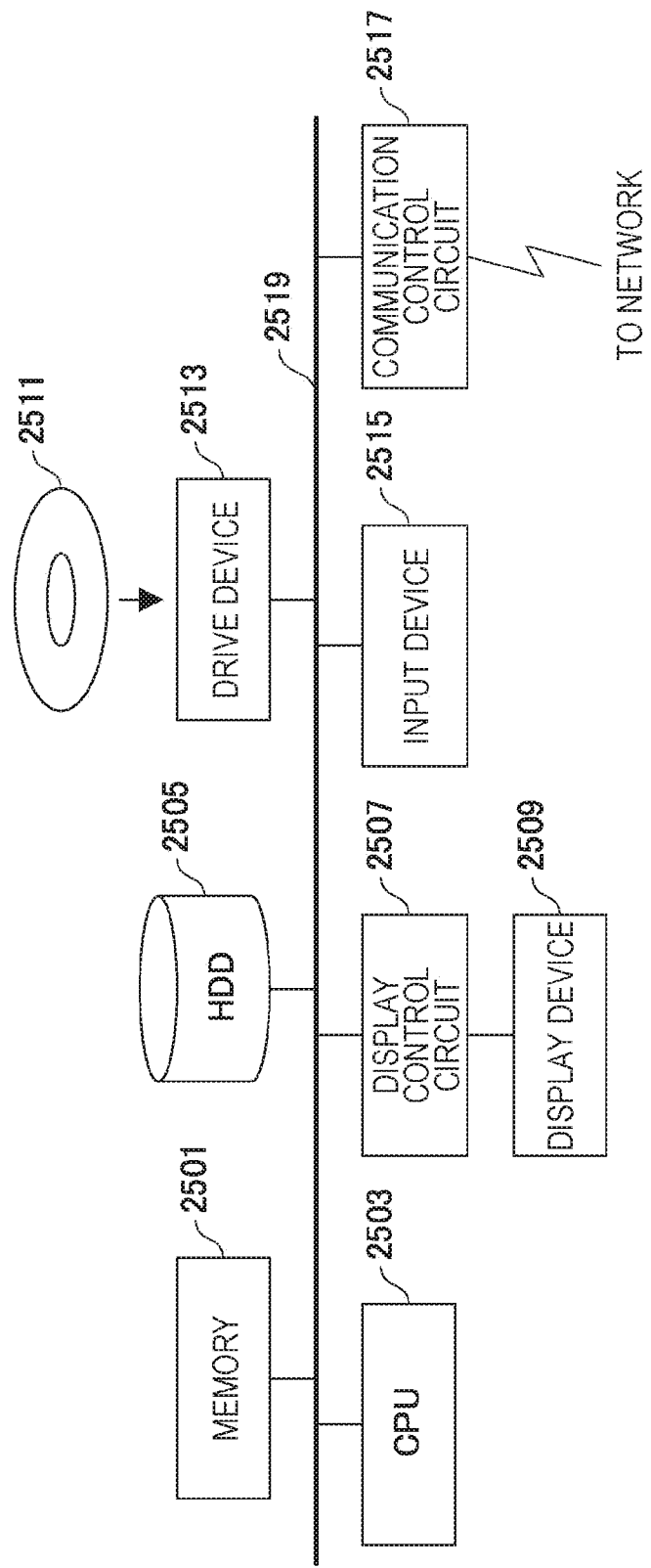
FIG. 28 is a function block diagram of a computer.

For example, the generation circuit 301 is implemented by executing a program stored in a memory 2501 in FIG. 28 by a central processing unit (CPU) 2503. The communication table memory 303 is disposed in the memory 2501 or a hard disk drive (HDD) 2505 in FIG. 28.

The generation circuit 301 generates a communication table based on information related to the topology of the multilayer full mesh system 1000. The generation circuit 301 stores the generated communication table in the communication table memory 303. The generation circuit 301 transmits the communication table stored in the communication table memory 303 to each node at a predetermined timing or in response to a request.

Figure 10:
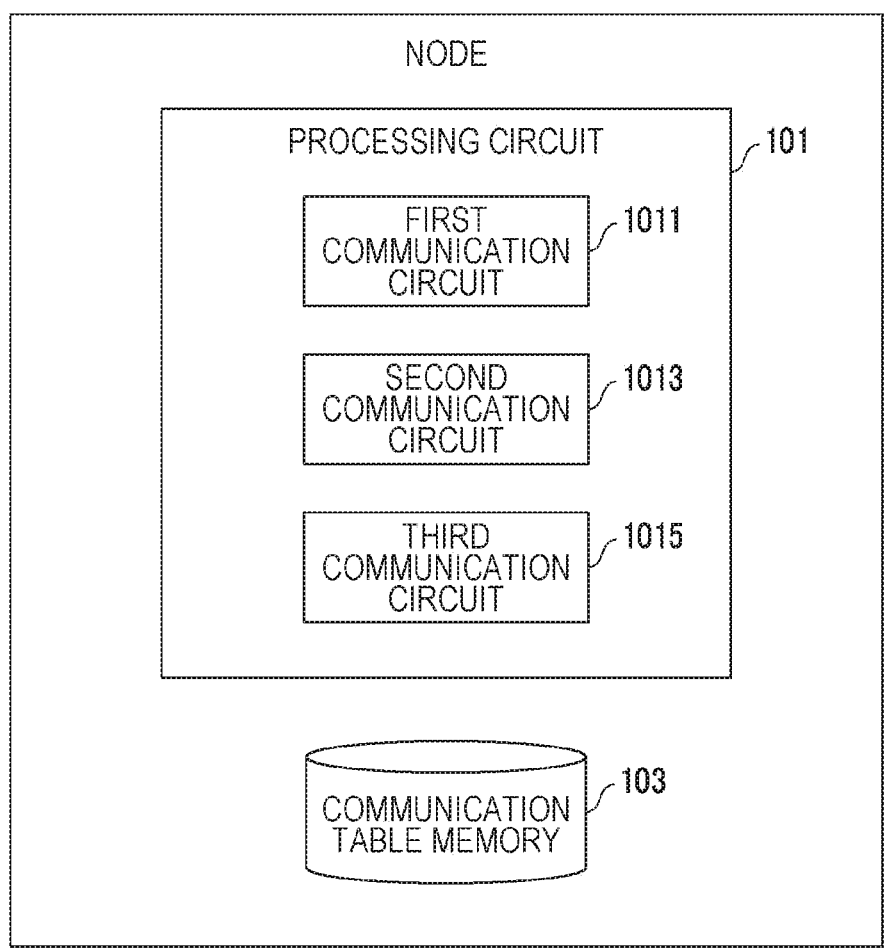
FIG. 10 is a function block diagram of a node of a first embodiment.

FIG. 10 is a function block diagram of a node. The node includes a processing circuit 101 and a communication table memory 103. The processing circuit 101 includes a first communication circuit 1011, a second communication circuit 1013, and a third communication circuit 1015.

For example, the processing circuit 101 is implemented by executing a program stored in a memory 2501 in FIG. 28 by the CPU 2503. The communication table memory 103 is disposed in the memory 2501 or the HDD 2505 in FIG. 28.

The communication table memory 103 stores the communication table received from the management apparatus 3. The first communication circuit 1011, the second communication circuit 1013, and the third communication circuit 1015 in the processing circuit 101 transmit and receive the packet in accordance with the communication table stored in the communication table memory 103.

Next, a process executed in the multilayer full mesh system 1000 of the present embodiment will be described using FIG. 11 to FIG. 24.

FIG. 11 is a diagram illustrating a process flow of a process executed by the multilayer full mesh system 1000 of a first embodiment as a whole.

The multilayer full mesh system 1000 executes the all-reduce under control of each Leaf switch (FIG. 11: step S1). In step S1, the all-reduce communication is performed. The all-reduce communication in step S1 is performed by the first communication circuit 1011 in accordance with the communication table stored in the communication table memory 103.

FIG. 12A to FIG. 16 are diagrams for describing the all-reduce communication performed between nodes under control of each Leaf switch. In FIG. 12A to FIG. 16, a square represents a Leaf switch. A circle represents a node. A line segment connecting the Leaf switch and the node represents a link. A number given to the node represents the value of the node.

First, a case where the number of nodes under control of the Leaf switch is an even number (four which is a power of two) will be described using FIG. 12A to FIG. 13.

Figure 12A:
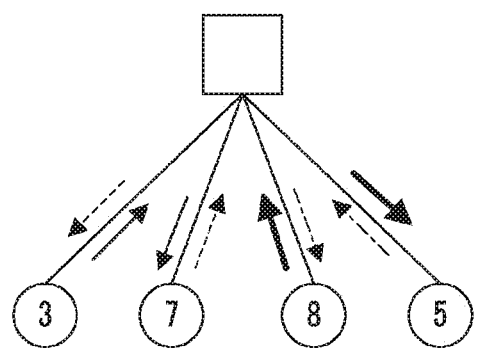
FIGS. 12A and 12B are diagrams for describing all-reduce communication performed between nodes under control of each Leaf switch.

For example, as illustrated in FIG. 12A, four nodes have "3", "7", "8", and "5", respectively. In this case, values are shared in each of a pair including two nodes, and the operation (addition) for the values is performed. Since a plurality of packets are not transmitted at the same time in the same direction of one route, the route contention does not occur.

Figure 12B:
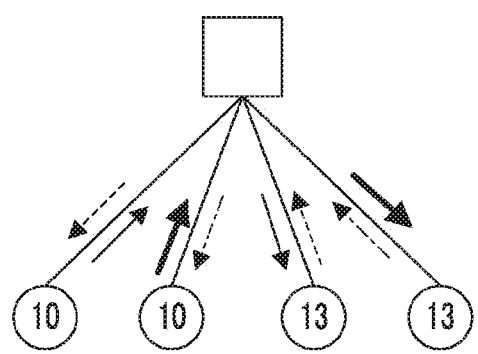

Then, as illustrated in FIG. 12B, two nodes have a value "10", and the remaining two nodes have a value "13". Values are shared in each of a pair including the node having the value "10" and the node having the value "13", and the operation (addition) for the values is performed. Since a plurality of packets are not transmitted at the same time in the same direction of one route, the route contention does not occur.

Figure 13:
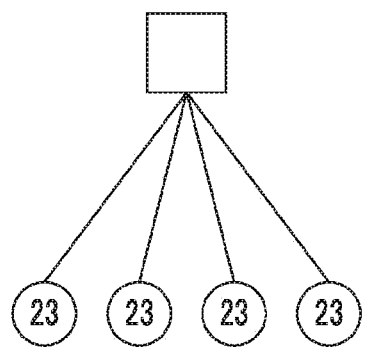
FIG. 13 is a diagram for describing all-reduce communication performed between nodes under control of each Leaf switch.

Accordingly, finally, each node has a value "23" as illustrated in FIG. 13.

Next, a case where the number of nodes under control of the Leaf switch is an odd number (five) will be described using FIG. 14A to FIG. 16.

Figure 14A:
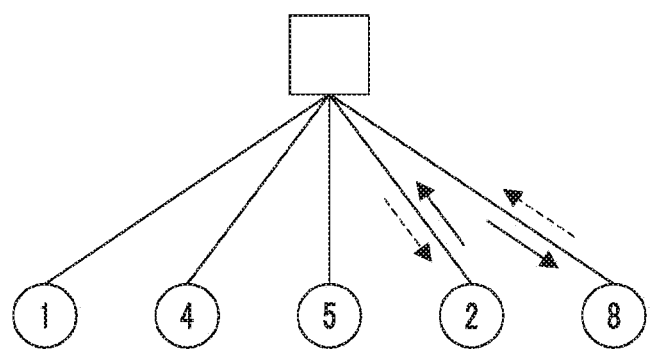
FIGS. 14A and 14B are diagrams for describing all-reduce communication performed between nodes under control of each Leaf switch.

For example, as illustrated in FIG. 14A, five nodes have "1", "4", "5", "2", and "8", respectively. In this case, values are shared in two nodes among the five nodes, and the operation (addition) for the values is performed. Since a plurality of packets are not transmitted at the same time in the same direction of one route, the route contention does not occur.

Figure 14B:
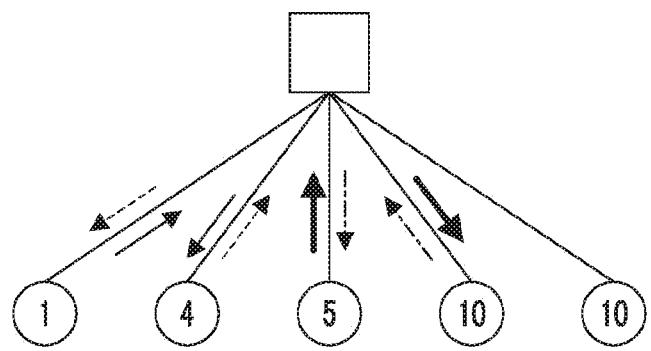

Then, as illustrated in FIG. 14B, the five nodes have "1", "4", "5", "10", and "10", respectively. Values are shared between the node having the value "1" and the node having the value "4", and the operation for the values is performed. Values are shared between the node having the value "5" and the node having the value "10", and the operation for the values is performed. Since a plurality of packets are not transmitted at the same time in the same direction of one route, the route contention does not occur.

Figure 15A:
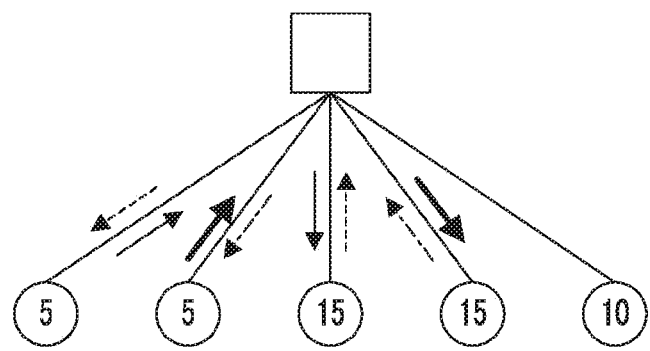
FIGS. 15A and 15B are diagrams for describing all-reduce communication performed between nodes under control of each Leaf switch.

Then, as illustrated in FIG. 15A, the five nodes have "5", "5", "15", "15", and "10", respectively. Values are shared between the node having the value "5" and the node having the value "15", and the operation for the values is performed. Values are shared between the node having the value "5" and the node having the value "15", and the operation for the values is performed. Since a plurality of packets are not transmitted at the same time in the same direction of one route, the route contention does not occur.

Figure 15B:
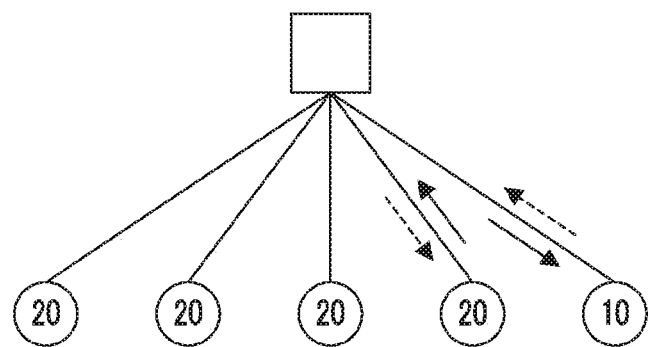

Then, as illustrated in FIG. 15B, the five nodes have "20", "20", "20", "20", and "10", respectively. The node having the value "20" notifies the value "20" to the node having the value "10". Since a plurality of packets are not transmitted at the same time in the same direction of one route, the route contention does not occur.

Figure 16:
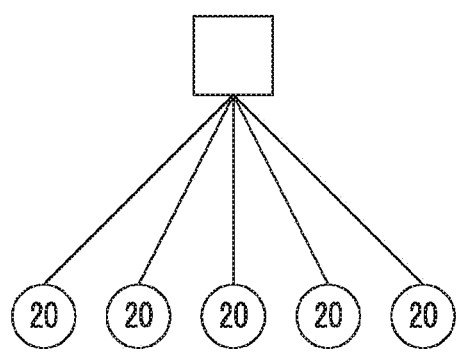
FIG. 16 is a diagram for describing all-reduce communication performed between nodes under control of each Leaf switch.

Then, as illustrated in FIG. 16, finally, each of the five nodes has the value "20".

While the above description is a description of one example of the all-reduce performed in step S1, the all-reduce may be basically performed using the same method even in a case where the number of nodes is other than that in the example.

Returning to the description of FIG. 11, the multilayer full mesh system 1000 executes the all-reduce based on a node having an ID equal to a predetermined number (for example, zero) in each layer (step S3). In step S3, the all-reduce communication is performed. The all-reduce communication in step S3 is performed by the second communication circuit 1013 in accordance with the communication table stored in the communication table memory 103.

Figure 17:
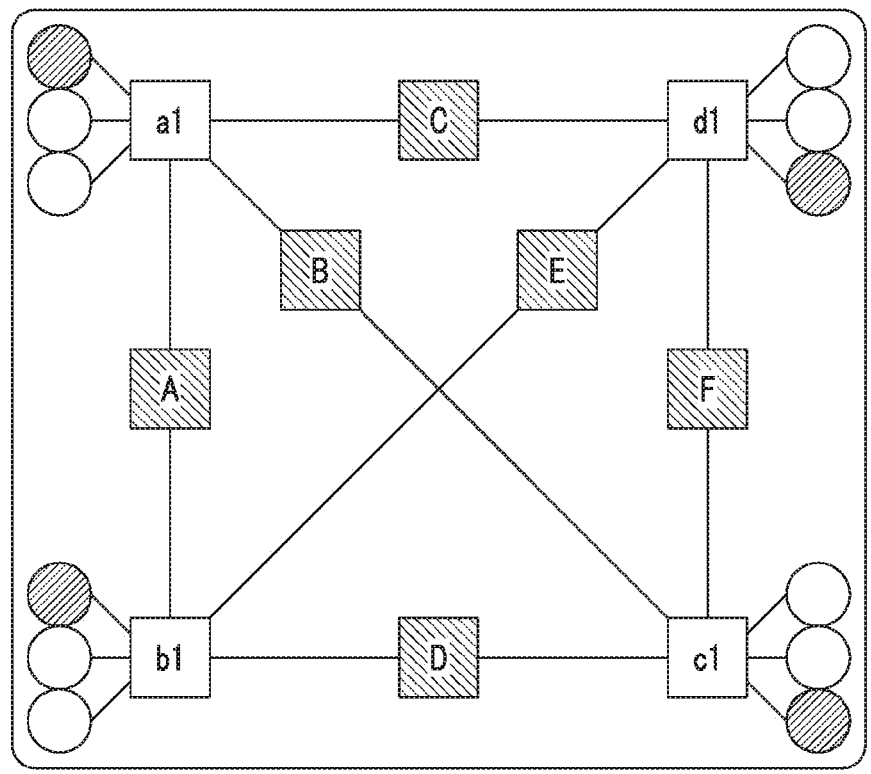
FIG. 17 is a diagram for describing all-reduce communication performed between nodes having an ID equal to a predetermined number in each layer.
Figure 18:
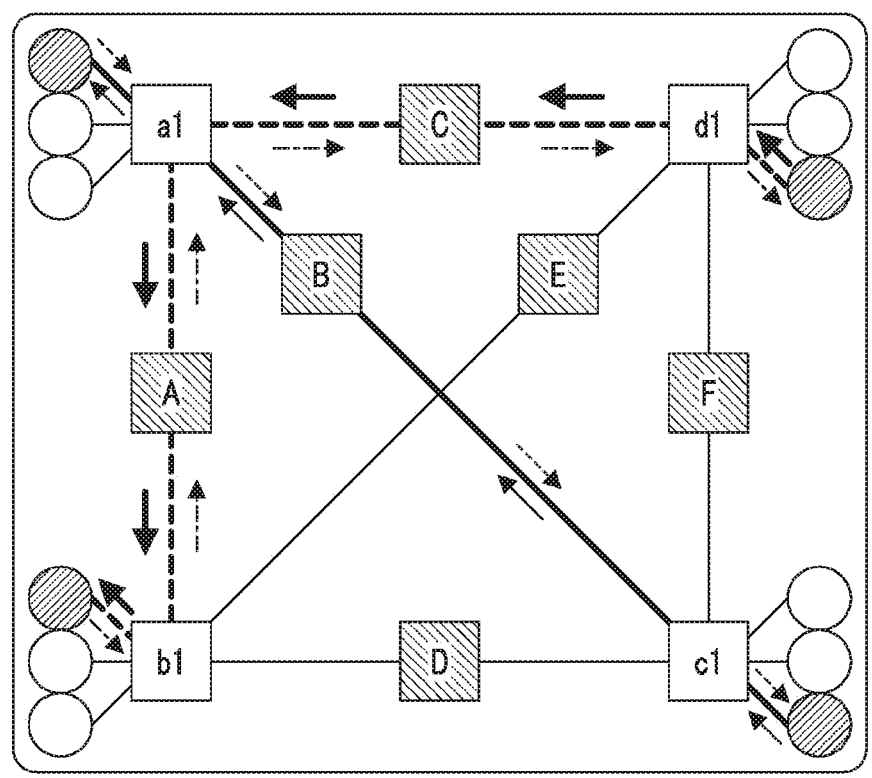
FIG. 18 is a diagram for describing all-reduce communication performed between nodes having an ID equal to a predetermined number in each layer.
Figure 19:
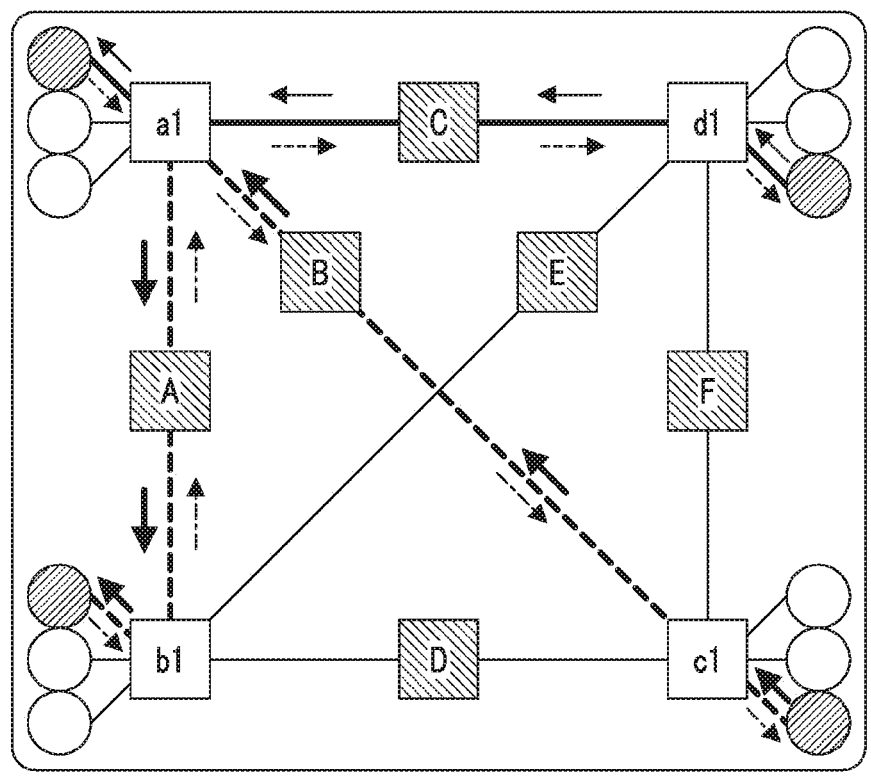
FIG. 19 is a diagram for describing all-reduce communication performed between nodes having an ID equal to a predetermined number in each layer.

FIG. 17 to FIG. 19 are diagrams for describing the all-reduce communication performed between nodes having an ID equal to a predetermined number in each layer.

In the present embodiment, an ID is assigned to a node under control of each Leaf switch. For example, a node under control of the Leaf switch a1 is assigned 0, 1, and 2 as an ID. A node under control of the Leaf switch a2 is assigned 0, 1, and 2 as an ID. A node under control of the Leaf switch a3 is assigned 0, 1, and 2 as an ID. A node under control of the Leaf switch b1 is assigned 0, 1, and 2 as an ID. A node under control of the Leaf switch b2 is assigned 0, 1, and 2 as an ID. A node under control of the Leaf switch b3 is assigned 0, 1, and 2 as an ID. A node under control of the Leaf switch c1 is assigned 0, 1, and 2 as an ID. A node under control of the Leaf switch c2 is assigned 0, 1, and 2 as an ID. A node under control of the Leaf switch c3 is assigned 0, 1, and 2 as an ID. A node under control of the Leaf switch d1 is assigned 0, 1, and 2 as an ID. A node under control of the Leaf switch d2 is assigned 0, 1, and 2 as an ID. A node under control of the Leaf switch d3 is assigned 0, 1, and 2 as an ID.

As illustrated in FIG. 17, a node having an ID equal to a predetermined number in a certain layer is a node that is hatched. In this case, the all-reduce is performed in the same manner as the all-reduce described in step S2. For example, as illustrated in FIG. 18, the all-reduce is performed between the node under control of the Leaf switch a1 and the node under control of the Leaf switch c1. The all-reduce is performed between the node under control of the Leaf switch b1 and the node under control of the Leaf switch d1. Since a plurality of packets are not transmitted at the same time in the same direction of one route, the route contention does not occur. Then, as illustrated in FIG. 19, the all-reduce is performed between the node under control of the Leaf switch a1 and the node under control of the Leaf switch d1. The all-reduce is performed between the node under control of the Leaf switch b1 and the node under control of the Leaf switch c1. Accordingly, each node having an ID equal to a predetermined number in a certain layer comes to have the same value. Since a plurality of packets are not transmitted at the same time in the same direction of one route, the route contention does not occur.

Returning to the description of FIG. 11, the multilayer full mesh system 1000 executes the all-reduce based on a node having an ID equal to a predetermined number in each column (step S5). In step S5, the all-reduce communication is performed. The transmission in step S5 is performed by the second communication circuit 1013 in accordance with the communication table stored in the communication table memory 103.

Figure 20:
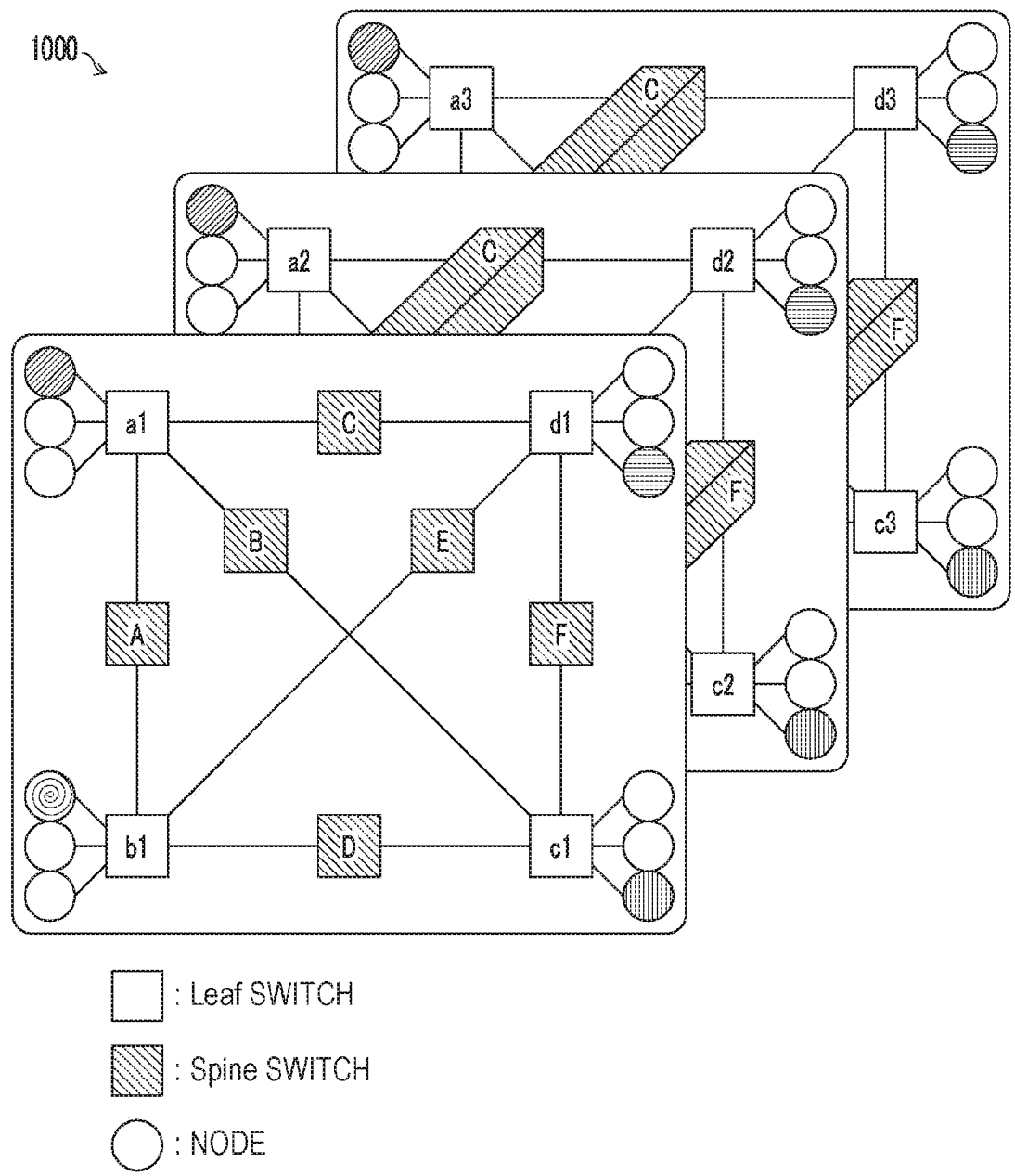
FIG. 20 is a diagram for describing all-reduce communication performed between nodes having an ID equal to a predetermined number in each column.

FIG. 20 is a diagram for describing the all-reduce communication performed between nodes having an ID equal to a predetermined number in each column.

In the present embodiment, a column includes a Leaf switch at the same position in the layer and a node under control of the Leaf switch. For example, in FIG. 20, the Leaf switch a1, the Leaf switch a2, and the Leaf switch a3 and the node under control of the Leaf switch a1, the node under control of the Leaf switch a2, and the node under control of the Leaf switch a3 belong to the same column. Similarly the Leaf switch b1, the Leaf switch b2, and the Leaf switch b3 and the node under control of the Leaf switch b1, the node under control of the Leaf switch b2, and the node under control of the Leaf switch b3 belong to the same column. Similarly the Leaf switch c1, the Leaf switch c2, and the Leaf switch c3 and the node under control of the Leaf switch c1, the node under control of the Leaf switch c2, and the node under control of the Leaf switch c3 belong to the same column. Similarly the Leaf switch d1, the Leaf switch d2, and the Leaf switch d3 and the node under control of the Leaf switch d1, the node under control of the Leaf switch d2, and the node under control of the Leaf switch d3 belong to the same column.

For example, a Leaf switch coupled to the same Spine switch and a node under control of the Leaf switch belong to the same column. For example, since the Leaf switch a1, the Leaf switch a2, and the Leaf switch a3 are coupled to the Spine switch A, the Spine switch B, and the Spine switch C, the Leaf switch a1, the Leaf switch a2, and the Leaf switch a3 belong to the same column. In addition, the node under control of the Leaf switch a1, the node under control of the Leaf switch a2, and the node under control of the Leaf switch a3 belong to the same column. Similarly, since the Leaf switch b1, the Leaf switch b2, and the Leaf switch b3 are coupled to the Spine switch A, the Spine switch D, and the Spine switch E, the Leaf switch b1, the Leaf switch b2, and the Leaf switch b3 belong to the same column. In addition, the node under control of the Leaf switch b1, the node under control of the Leaf switch b2, and the node under control of the Leaf switch b3 belong to the same column. Similarly, since the Leaf switch c1, the Leaf switch c2, and the Leaf switch c3 are coupled to the Spine switch B, the Spine switch D, and the Spine switch F, the Leaf switch c1, the Leaf switch c2, and the Leaf switch c3 belong to the same column. In addition, the node under control of the Leaf switch c1, the node under control of the Leaf switch c2, and the node under control of the Leaf switch c3 belong to the same column. Similarly, since the Leaf switch d1, the Leaf switch d2, and the Leaf switch d3 are coupled to the Spine switch C, the Spine switch E, and the Spine switch F, the Leaf switch d1, the Leaf switch d2, and the Leaf switch d3 belong to the same column. In addition, the node under control of the Leaf switch d1, the node under control of the Leaf switch d2, and the node under control of the Leaf switch d3 belong to the same column.

The all-reduce in step S5 is performed in the same manner as the all-reduce described in step S1. In the example in FIG. 20, the number of nodes in each column is three, and the all-reduce is performed in each column. For example, the all-reduce is performed between nodes with the same type of hatching. Since the same all-reduce as the all-reduce described in step S1 is performed, the route contention does not occur.

Returning to FIG. 11, the multilayer full mesh system 1000 transmits the result of step S5 by broadcasting from a node having an ID equal to a predetermined number (for example, a node on which the all-reduce is executed in step S5) to another node under control of each Leaf switch (step S7). The all-reduce communication in step S7 is performed by the third communication circuit 1015 in accordance with the communication table stored in the communication table memory 103. Then, the process is finished.

Figure 21:
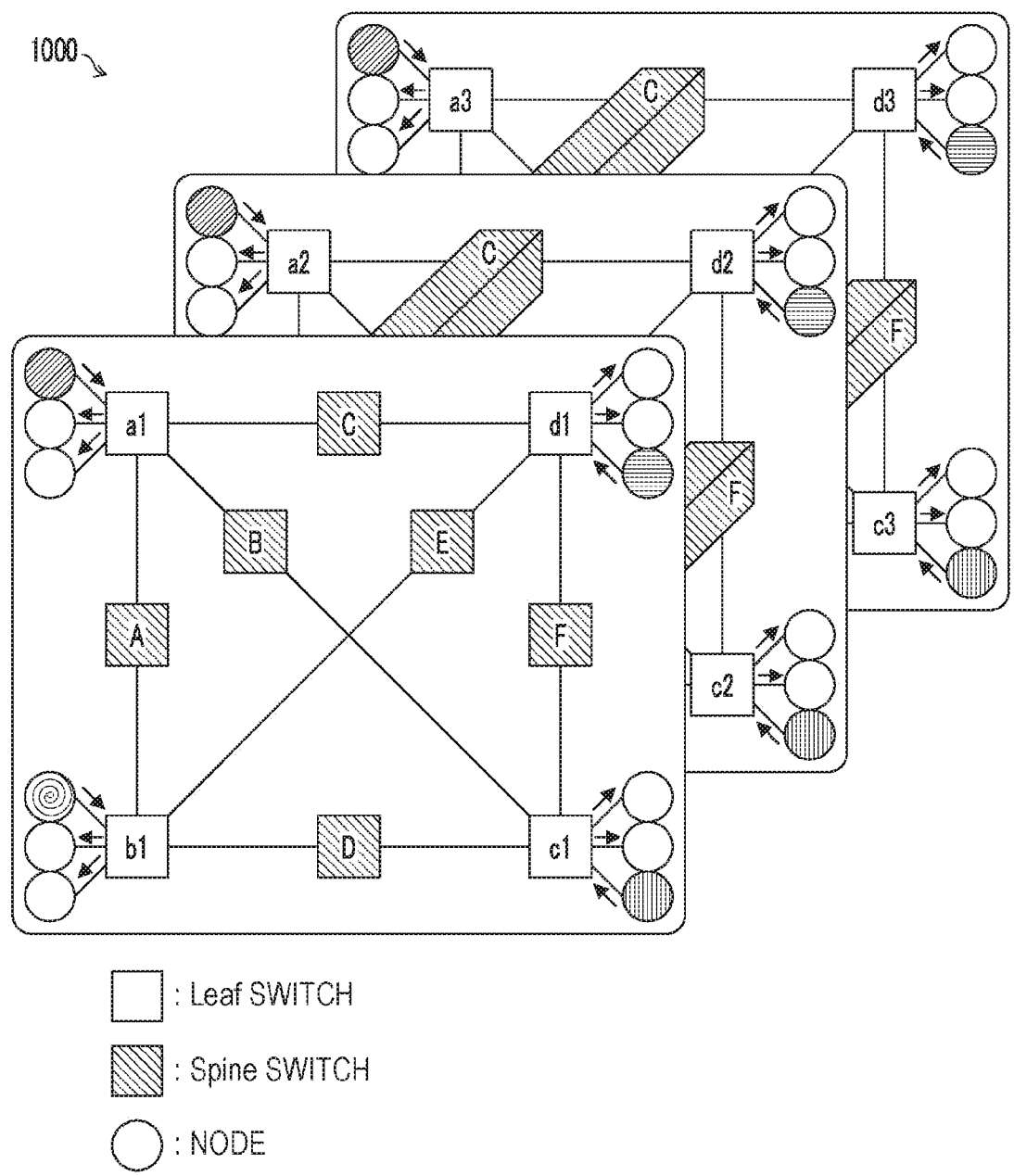
FIG. 21 is a diagram illustrating communication in the case of transmitting a result from a node having an ID equal to a predetermined number to another node under control of each Leaf switch.

FIG. 21 is a diagram illustrating communication in the case of transmitting the result from a node having an ID equal to a predetermined number to another node under control of each Leaf switch. A node that has the result of step S5 transmits the result to another node under control of each Leaf switch. Accordingly, each node in the multilayer full mesh system 1000 may have the result of the all-reduce. Since a plurality of packets are not transmitted at the same time in the same direction of one route, the route contention does not occur.

Next, a process in which the management apparatus 3 generates the communication table will be described using FIG. 22 and FIG. 23. For example, the present process is executed in a case where the construction of the multilayer full mesh system 1000 is completed.

Figure 22:
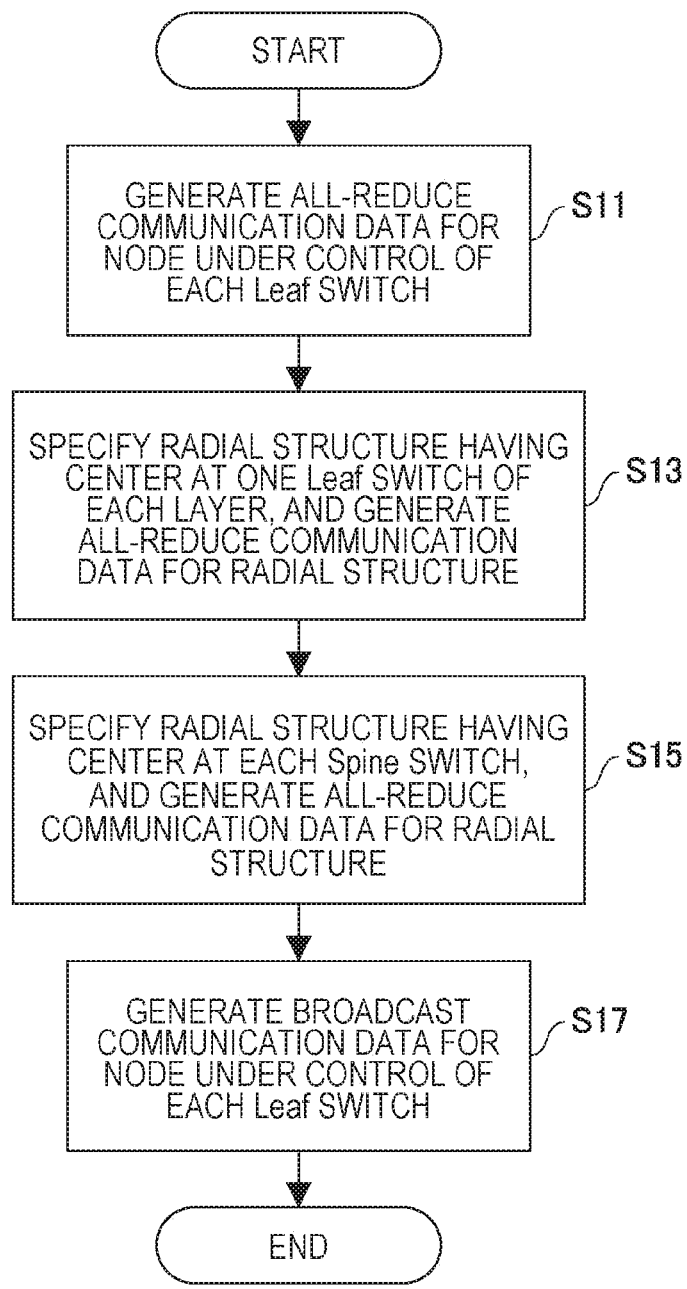
FIG. 22 is a diagram illustrating a process flow of a process in which the management apparatus generates a communication table.

FIG. 22 is a diagram illustrating a process flow of the process in which the management apparatus 3 generates the communication table.

The generation circuit 301 of the management apparatus 3 reads information related to the topology of the multilayer full mesh system 1000 (for example, information related to the number of nodes) from the HDD 2505. The generation circuit 301 generates all-reduce communication data for the node under control of each Leaf switch (FIG. 22: step S11). The generation circuit 301 writes the generated communication data into the communication table stored in the communication table memory 303. The communication data generated in step S11 is communication data for performing the all-reduce for each Leaf switch in parallel at the same time.

A generation procedure (Allreduce(n)) for the communication table in the case of performing the all-reduce among n (n is a natural number) nodes will be described. In the present embodiment, the communication table is generated by a recursive process.

The process is finished in a case where a number n of nodes under control of the Leaf switch is one.

In a case where the number n of nodes under control of the Leaf switch is two, the communication data for communication between two nodes is written into the communication table.

In a case where the number n of nodes under control of the Leaf switch is an odd number 2m+1 (m is a natural number), two nodes (a node P and a node Q) are selected from the n nodes, and the communication data for the all-reduce communication between the node P and the node Q is written into the communication table. Then, Allreduce(2m) is called for any node of the node P and the node Q and the remaining (2m−1) nodes (for example, 2m nodes). The communication data for delivering the result of Allreduce(2m) from the node P to the node Q is written into the communication table.

In a case where the number of nodes under control of the Leaf switch is 2m (m is a natural number greater than or equal to two), the Leaf switch is divided into a group of m nodes and a group of m nodes, and Allreduce(m) is called for each group in parallel at the same time.

Returning to the description of FIG. 22, the generation circuit 301 specifies a radial structure that has its center at any Leaf switch in each layer. The generation circuit 301 generates the all-reduce communication data for each specified radial structure (step S13). The generation circuit 301 writes the generated communication data into the communication table stored in the communication table memory 303. The communication data generated in step S13 is communication data for performing the all-reduce in each layer in parallel at the same time.

For example, the radial structure in step S13 is a radial structure that has its center at the Leaf switch a1 and is represented by two bold solid lines and two bold broken lines in FIG. 18, and a radial structure that has its center at the Leaf switch a1 and is represented by two bold solid lines and two bold broken lines in FIG. 19. Accordingly, in the examples in FIG. 18 and FIG. 19, the communication data of the all-reduce communication among four nodes with hatching is generated by Allreduce(4).

The generation circuit 301 specifies a radial structure that has its center at each Spine switch. The generation circuit 301 generates the all-reduce communication data for the specified radial structure (step S15). The generation circuit 301 writes the generated communication data into the communication table stored in the communication table memory 303. The communication data generated in step S15 is communication data for performing the all-reduce in each column in parallel at the same time.

For example, the radial structure in step S15 is a radial structure represented by links connecting three nodes with the same hatching in FIG. 20. Accordingly, in the example in FIG. 20, the communication data of the all-reduce communication among three nodes with the same hatching is generated by Allreduce(3).

The generation circuit 301 generates broadcast communication data for the node under control of each Leaf switch (step S17). The generation circuit 301 writes the generated communication data into the communication table stored in the communication table memory 303 and transmits the communication table to each node. Then, the process is finished.

FIG. 23 is a diagram illustrating one example of the communication table. In the example in FIG. 23, a phase number and the content of communication to be executed are registered in the communication table. A number in the content of communication represents the ID of the node. Communication 1 and communication 2 are executed in parallel at the same time. For example, in phase 2, the all-reduce communication between a node 1 and a node 2 and the all-reduce communication between a node 3 and a node 4 are executed in parallel at the same time. According to the communication table illustrated in FIG. 23, each node in phase 1 to phase 4 operates as follows.

Node 1: -, 2, 3, -
Node 2: -, 1, 4, -
Node 3: -, 4, 1, -
Node 4: 5, 3, 2, 5 (transmission)
Node 5: 4, -, -, 4 (reception)

Here, "-" represents that communication is not performed. A number represents the ID of a communication opponent. Transmission is represented by "(transmission)", and reception is represented by "(reception)".

Next, a process executed in a case where each node transmits the packet will be described using FIG. 24. The communication table received from the management apparatus 3 is stored in the communication table memory 103.

Figure 24:
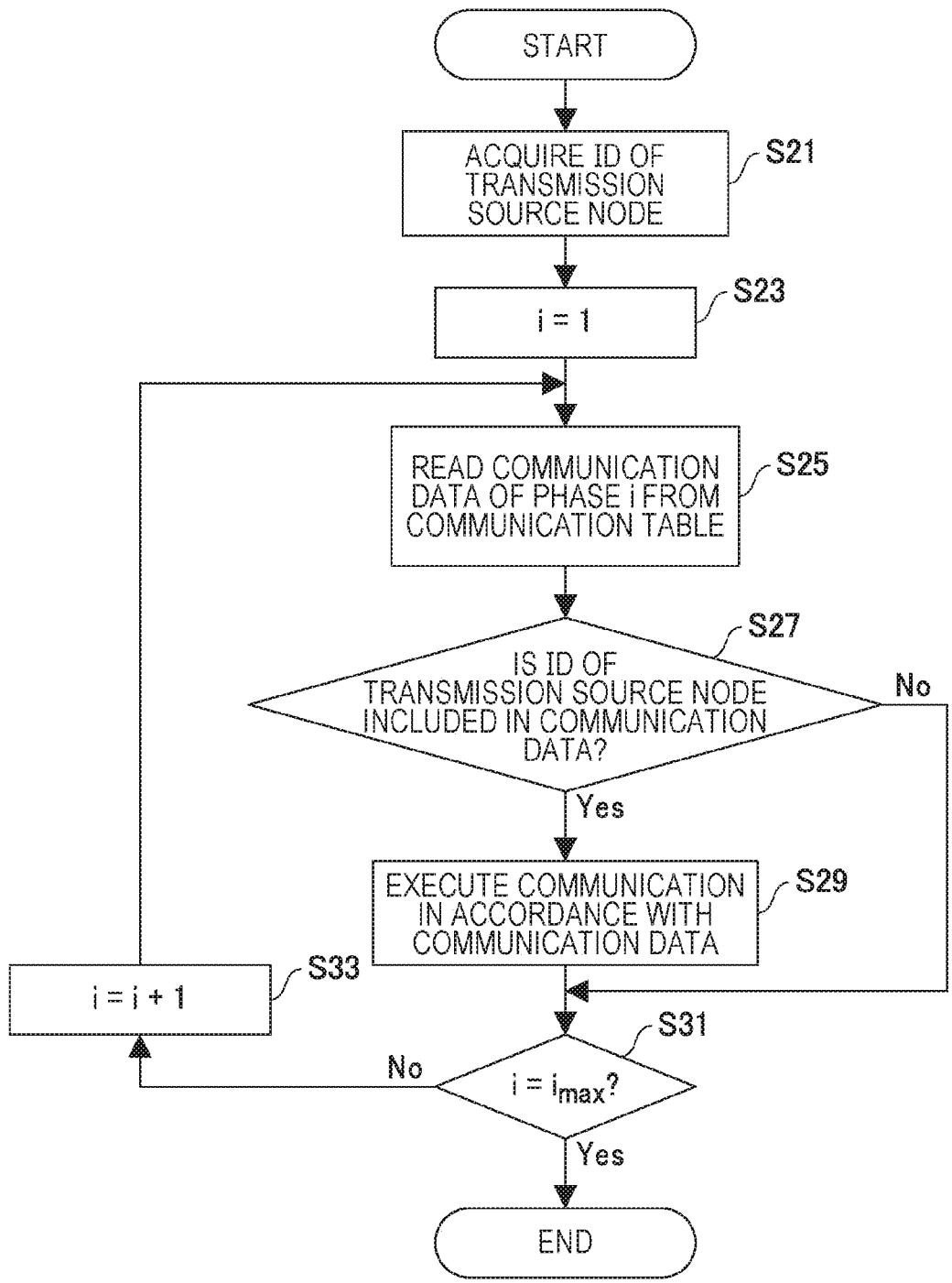
FIG. 24 is a diagram illustrating a process flow of a process executed in a case where each node transmits a packet.

The processing circuit 101 in the node acquires the ID of the transmission source node of the packet (for example, the node of the processing circuit 101) from the HDD 2505 (FIG. 24: step S21).

The processing circuit 101 sets i that is a variable representing the phase number to 1 (step S23).

The processing circuit 101 reads the communication data of phase i from the communication table stored in the communication table memory 103 (step S25).

The processing circuit 101 determines whether or not the ID of the node acquired in step S21 is included in the communication data read in step S25 (step S27).

In a case where the ID of the node acquired in step S21 is not included in the communication data read in step S25 (step S27: No route), the node does not perform communication in phase i. Thus, the process transitions to step S31.

In a case where the ID of the node acquired in step S21 is included in the communication data read in step S25 (step S27: Yes route), the processing circuit 101 executes communication in accordance with the communication data read in step S25 (step S29). In step S29, the first communication circuit 1011, the second communication circuit 1013, or the third communication circuit 1015 operates depending on the content of communication.

The processing circuit 101 determines whether or not $i=i_{max}$ is satisfied (step S31). The maximum value of the phase number is $i_{max}$.

In a case where $i=i_{max}$ is not satisfied (step S31: No route), the processing circuit 101 increments i by one (step S33) and returns to the process of step S25. The finish of the phase is confirmed by barrier synchronization. In a case where $i=i_{max}$ is satisfied (step S31: Yes route), the process is finished.

As described above, in a case where a representative node under control of each Leaf switch executes the all-reduce, the occurrence of the route contention may be avoided in the case of performing the all-reduce communication in the multilayer full mesh system 1000. In addition, in the case of using the method of the present embodiment, the all-reduce may be executed with a calculation amount of approximately O(log n) (n is the number of nodes).

Second Embodiment

Figure 25:
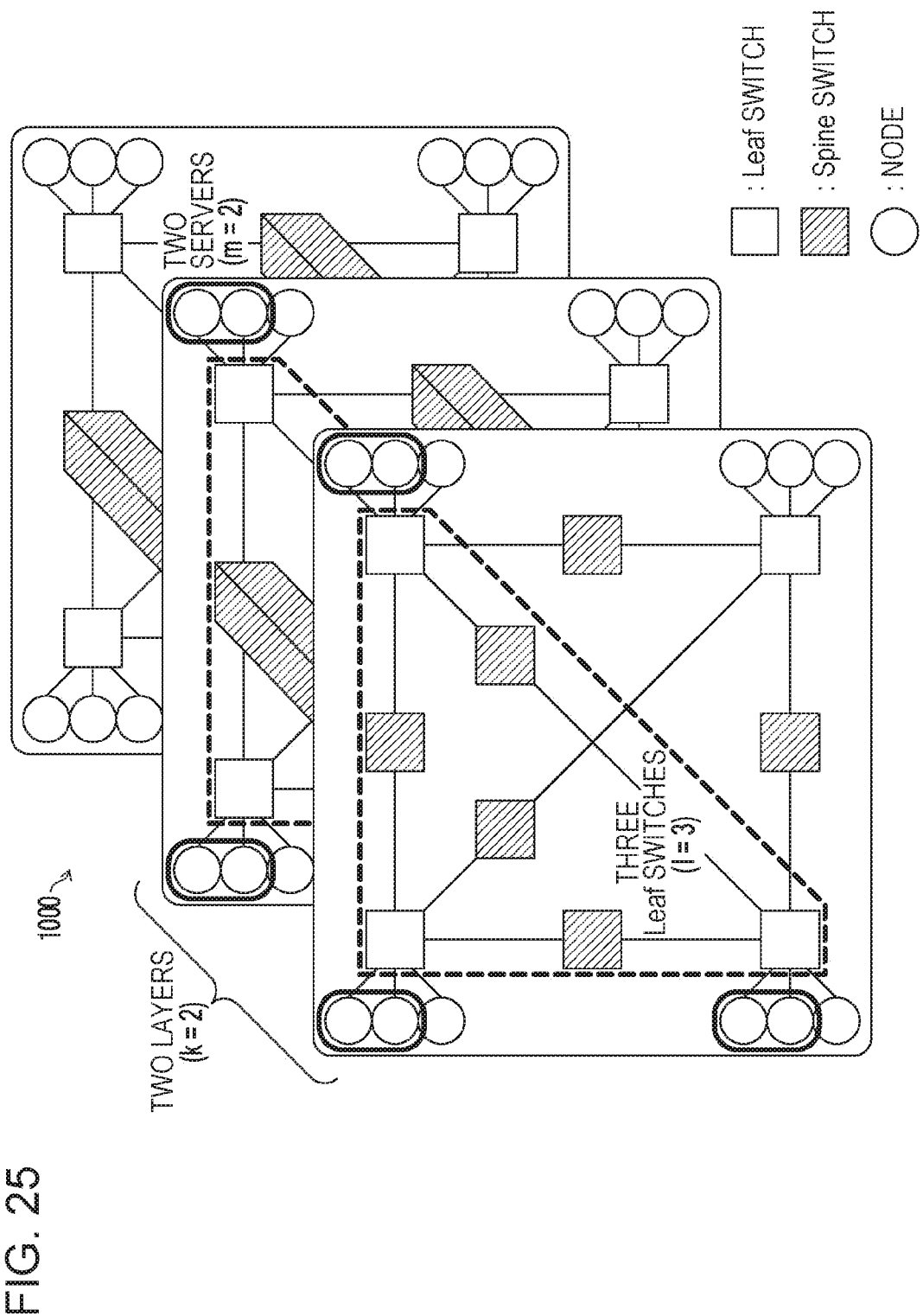
FIG. 25 is a diagram for describing a case in which a part of nodes in the multilayer full mesh system participates.

While the all-reduce in which all nodes in the multilayer full mesh system 1000 participate is performed in the first embodiment, the all-reduce in which a part of nodes in the multilayer full mesh system 1000 participate is performed in a second embodiment. For example, in an example in FIG. 25, two layers among three layers of the multilayer full mesh system 1000 are used. In addition, in each used layer, six of 12 nodes participate in the all-reduce. Three Leaf switches among four Leaf switches participate in the all-reduce. Four Spine switches among six Spine switches participate in the all-reduce.

By doing so, appropriate sizes of resources may be used depending on the calculation size of a job.

The all-reduce in which a part of nodes of the multilayer full mesh system 1000 participate is basically performed using the same method as the all-reduce of the first embodiment. Thus, a detailed description of the all-reduce will not be repeated.

Third Embodiment

In the first embodiment, the all-reduce based on a node having an ID equal to a predetermined number is executed in each layer, and then, the all-reduce based on a node having an ID equal to a predetermined number in is executed in each column. Meanwhile, in a third embodiment, the all-reduce based on a node having an ID equal to a predetermined number is executed in each column, and then, the all-reduce based on a node having an ID equal to a predetermined number is executed in each layer.

Figure 26:
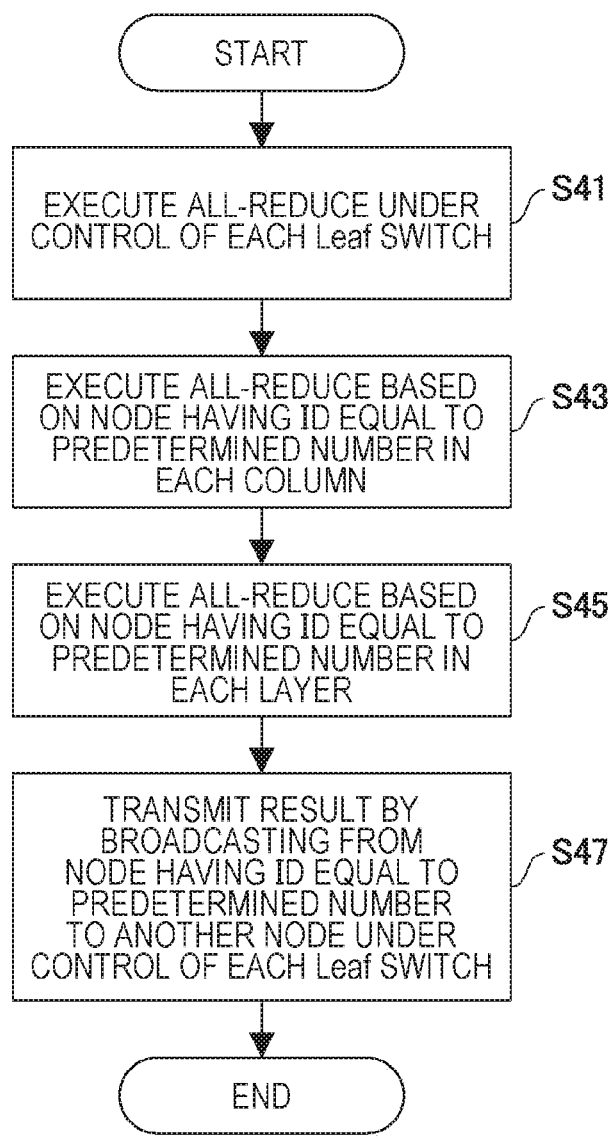
FIG. 26 is a diagram illustrating a process flow of a process executed by a multilayer full mesh system of a third embodiment as a whole.

FIG. 26 is a diagram illustrating a process flow of a process executed by the multilayer full mesh system 1000 of the third embodiment as a whole.

The multilayer full mesh system 1000 executes the all-reduce under control of each Leaf switch (FIG. 26: step S41). In step S41, the all-reduce communication is performed. The all-reduce communication in step S41 is performed by the first communication circuit 1011.

The multilayer full mesh system 1000 executes the all-reduce based on a node having an ID equal to a predetermined number (for example, zero) in each column (step S43). In step S43, the all-reduce communication is performed. The all-reduce communication in step S43 is performed by the second communication circuit 1013.

The multilayer full mesh system 1000 executes the all-reduce based on a node having an ID equal to a predetermined number in each layer (step S45). In step S45, the all-reduce communication is performed. The all-reduce communication in step S45 is performed by the second communication circuit 1013.

The multilayer full mesh system 1000 transmits the result of step S45 by broadcasting from a node having an ID equal to a predetermined number (for example, a node on which the all-reduce is executed in step S45) to another node under control of each Leaf switch (step S47). The transmission in step S47 is performed by the third communication circuit 1015. Then, the process is finished.

Even in the case of executing the above process, the occurrence of the route contention may be avoided in the case of performing the all-reduce communication in the multilayer full mesh system 1000.

Fourth Embodiment

The management apparatus 3 generates the communication table in the first embodiment. However, in a fourth embodiment, a node in the multilayer full mesh system 1000 generates the communication table and distributes to another node.

Figure 27:
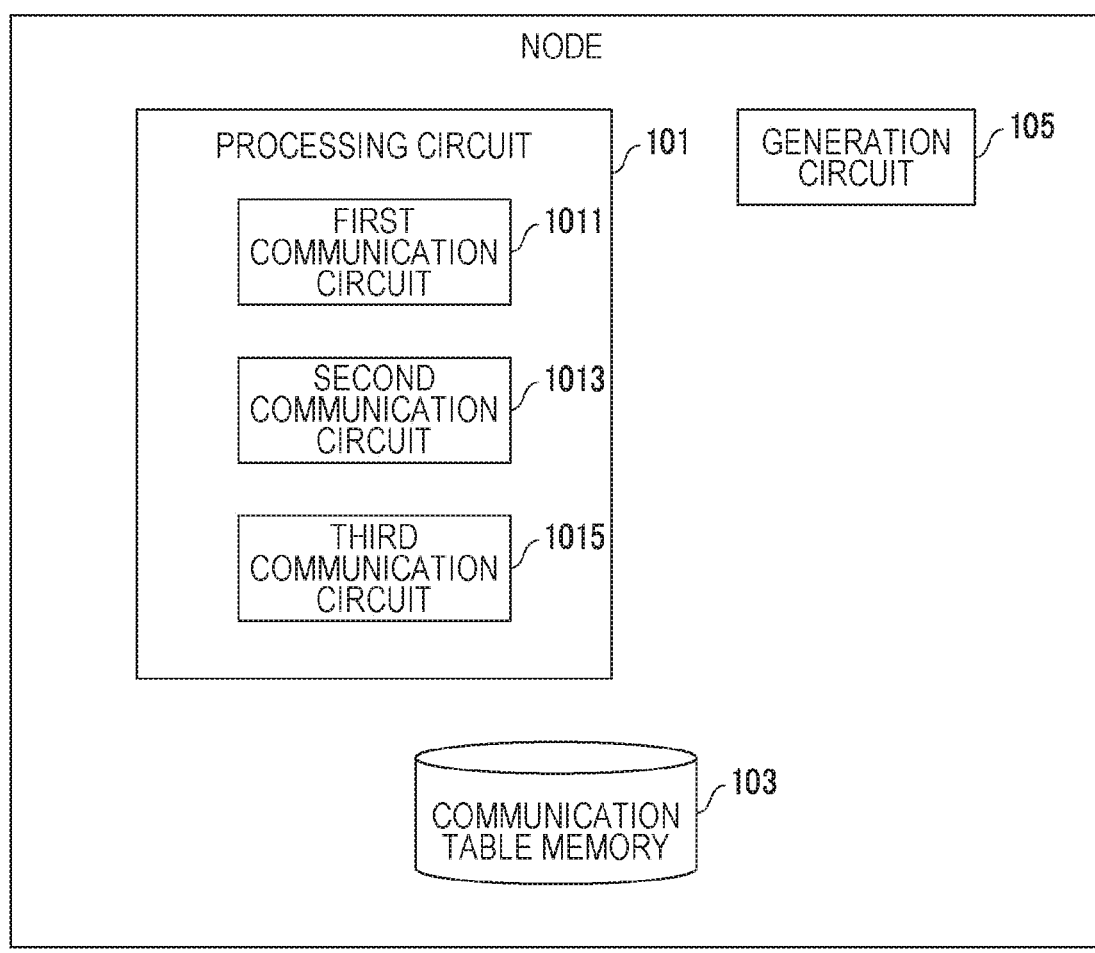
FIG. 27 is a function block diagram of a node of a fourth embodiment.

FIG. 27 is a function block diagram of the node of the fourth embodiment. The node includes the processing circuit 101, the communication table memory 103, and a generation circuit 105. The processing circuit 101 includes the first communication circuit 1011, the second communication circuit 1013, and the third communication circuit 1015.

For example, the processing circuit 101 and the generation circuit 105 are implemented by executing a program stored in the memory 2501 in FIG. 28 by the CPU 2503. The communication table memory 103 is disposed in the memory 2501 or the HDD 2505 in FIG. 28.

The generation circuit 105 generates the communication table based on information related to the topology of the multilayer full mesh system 1000 and stores the generated communication table in the communication table memory 103. In addition, the generation circuit 105 transmits the generated communication table to another node in the multilayer full mesh system 1000 at a predetermined timing or in response to a request. The first communication circuit 1011, the second communication circuit 1013, and the third communication circuit 1015 in the processing circuit 101 transmit and receive the packet in accordance with the communication table stored in the communication table memory 103.

In a case where the above configuration is employed, the management apparatus 3 for generating the communication table is not separately disposed.

While one embodiment of the embodiments is described thus far, the embodiments are not limited thereto. For example, the function block configurations of the node and the management apparatus 3 described above may not match the actual program module configurations.

In addition, the configuration of each table described above is one example, and the above configuration may not be used. Furthermore, in the process flow, the order of processes may be changed without affecting the process result. Furthermore, execution may be performed in parallel.

In addition, the management apparatus 3 may not send the whole communication table to each node and may send only the communication data related to each node.

In addition, the multilayer full mesh system 1000 is not limited to the example illustrated above.

The node and the management apparatus 3 described above are computer apparatuses. As illustrated in FIG. 28, the memory 2501, the CPU 2503, the HDD 2505, a display control circuit 2507 coupled to a display device 2509, a drive device 2513 for a removable disk 2511, an input device 2515, and a communication control circuit 2517 for connecting to a network are coupled through a bus 2519. An operating system (OS) and an application program for embodying the process in the embodiments are stored in the HDD 2505 and are read into the memory 2501 from the HDD 2505 in a case where the operating system and the application program are executed by the CPU 2503. The CPU 2503 controls the display control circuit 2507, the communication control circuit 2517, and the drive device 2513 to perform a predetermined operation depending on the process content of the application program. In addition, while data in the middle of the process is mainly stored in the memory 2501, the data may be stored in the HDD 2505. In the embodiments, the application program for embodying the process described above is distributed as being stored in the computer-readable removable disk 2511 and is installed on the HDD 2505 from the drive device 2513. The installation on the HDD 2505 may be performed through a network such as the Internet and the communication control circuit 2517. Such a computer apparatus implements various functions described above by organic cooperation between hardware such as the CPU 2503 and the memory 2501 described above and a program such as the OS and the application program.

Figure 29:
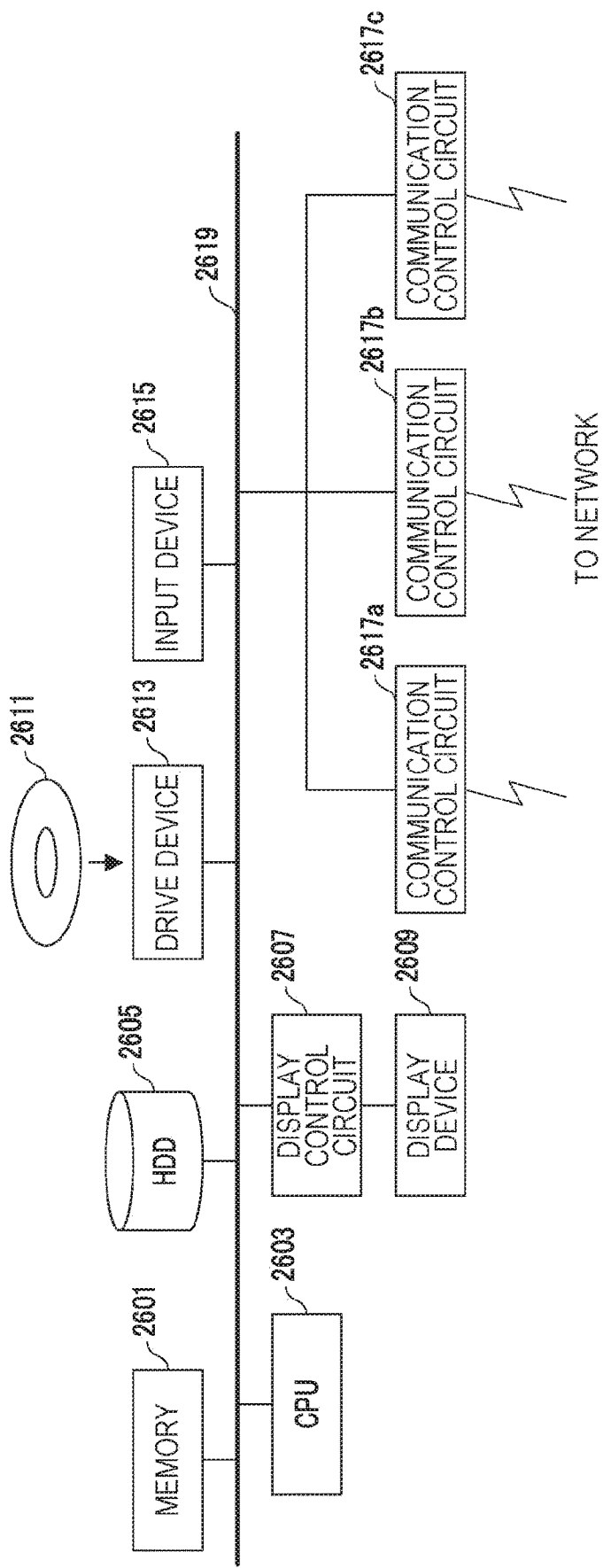
FIG. 29 is a function block diagram of a relay apparatus.

In addition, as illustrated in FIG. 29, the Leaf switch and the Spine switch described above may have a configuration in which a memory 2601, a CPU 2603, an HDD 2605, a display control circuit 2607 coupled to a display device 2609, a drive device 2613 for a removable disk 2611, an input device 2615, and a communication control circuit 2617 (in FIGS. 29, 2617a to 2617c) for connecting to a network are coupled through a bus 2619. Depending on cases, the display control circuit 2607, the display device 2609, the drive device 2613, and the input device 2615 may not be included. An operating system (OS) and an application program for embodying the process in the embodiments are stored in the HDD 2605 and is read into the memory 2601 from the HDD 2605 in a case where the operating system and the application program are executed by the CPU 2603. The CPU 2603 may control the display control circuit 2607, the communication control circuit 2617, and the drive device 2613 to perform an operation. Data that is input through any communication control circuit 2617 is output through another communication control circuit 2617. The CPU 2603 appropriately switches the output destination by controlling the communication control circuit 2617. In addition, data in the middle of the process is stored in the memory 2601 and may be stored in the HDD 2605. In the embodiments of the present technology, the application program for embodying the process described above is distributed as being stored in the computer-readable removable disk 2611 and is installed on the HDD 2605 from the drive device 2613. The installation on the HDD 2605 may be performed through a network such as the Internet and the communication control circuit 2617. Such a computer apparatus implements various functions described above by organic cooperation among hardware such as the CPU 2603 and the memory 2601 described above, the OS, and the application program.

The embodiments described above may be summarized as follows.

An information processing apparatus according to a first aspect of the embodiments is an information processing apparatus among a plurality of information processing apparatuses in a multilayer full mesh system including a plurality of spine switches, a plurality of leaf switches, and the plurality of information processing apparatuses. The information processing apparatus includes (A) a first communication circuit (the first communication circuit 1011 in the embodiments is one example of the first communication circuit) that performs first all-reduce communication with another information processing apparatus coupled to a first leaf switch coupled to the information processing apparatus, (B) a second communication circuit (the second communication circuit 1013 in the embodiments is one example of the second communication circuit) that performs second all-reduce communication with one information processing apparatus coupled to a second leaf switch included in the same layer as the first leaf switch and third all-reduce communication with one information processing apparatus coupled to a third leaf switch which is coupled to a spine switch coupled to the first leaf switch and is included in a layer different from the layer including the first leaf switch, using a result of the first all-reduce communication, and (C) a third communication circuit (the third communication circuit 1015 in the embodiments is one example of the third communication circuit) that transmits a result of a process of the second communication circuit to the other information processing apparatus coupled to the first leaf switch.

The occurrence of the route contention may be avoided in the case of performing the all-reduce communication in the multilayer full mesh system.

In addition, the second communication circuit may perform (b1) the second all-reduce communication with the one information processing apparatus coupled to the second leaf switch using the result of the first all-reduce communication and (b2) the third all-reduce communication with the one information processing apparatus coupled to the third leaf switch using a result of the second all-reduce communication.

The all-reduce is appropriately executed.

In addition, the second communication circuit may perform (b3) the third all-reduce communication with the one information processing apparatus coupled to the third leaf switch using the result of the first all-reduce communication and (b4) the second all-reduce communication with the one information processing apparatus coupled to the second leaf switch using a result of the third all-reduce communication.

The all-reduce is appropriately executed.

In addition, the information processing apparatus may further include (D) a generation circuit (the generation circuit 105 in the embodiments is one example of the generation circuit) that generates a communication table used by each of the plurality of information processing apparatuses for communication and transmits the generated communication table to an information processing apparatus other than the information processing apparatus among the plurality of information processing apparatuses.

Each of the plurality of information processing apparatuses may perform the all-reduce communication such that the route contention does not occur as a whole.

An information processing method according to a second aspect of the embodiments is an information processing method executed by an information processing apparatus among a plurality of information processing apparatuses in a multilayer full mesh system including a plurality of spine switches, a plurality of leaf switches, and the plurality of information processing apparatuses. The information processing apparatus includes a process of (E) performing first all-reduce communication with another information processing apparatus coupled to a first leaf switch coupled to the information processing apparatus, (F) performing second all-reduce communication with one information processing apparatus coupled to a second leaf switch included in the same layer as the first leaf switch and third all-reduce communication with one information processing apparatus coupled to a third leaf switch which is coupled to a spine switch coupled to the first leaf switch and is included in a layer different from the layer including the first leaf switch, using a result of the first all-reduce communication, and (G)

transmitting results of the second all-reduce communication and the third all-reduce communication to the other information processing apparatus coupled to the first leaf switch.

A program for causing a computer or a processor to perform the process of the method may be created. The program is stored in a computer-readable storage medium or a storage device such as a flexible disk, a CD-ROM, a magneto-optical disk, a semiconductor memory, or a hard disk. An intermediate process result is temporarily held in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus operable as one of a plurality of nodes in a multilayer full mesh system, the multilayer full mesh system including a plurality of layers, each layer including a plurality of spine switches, a plurality of leaf switches, and a plurality of information processing apparatuses, the information processing apparatus comprising:
   a memory;
   a processor coupled to the memory and configured to:
      perform first all-reduce communication between the information processing apparatus and a first information processing apparatus via a first leaf switch, the first information processing apparatus being any one of the plurality of information processing apparatuses in a first layer, the first leaf switch being coupled to the information processing apparatus and the first information processing apparatus in the first layer, the first layer being any one of the plurality of layers;
      in response to a result of the first all-reduce communication, perform second all-reduce communication and third all-reduce communication, the second all-reduce communication being all-reduce communication between the information processing apparatus and a second information processing apparatus coupled to a second leaf switch included in the first layer same as the first leaf switch, the second information processing apparatus being one of the plurality of information processing apparatuses in the first layer, the third all-reduce communication being all-reduce communication between the information processing apparatus in the first layer and a third information processing apparatus in a second layer different from the first layer via a spine switch, the third information processing apparatus being one of the plurality of information processing apparatuses in the second layer, the spine switch being coupled to both the first leaf switch in the first layer and a third leaf switch coupled to the third information processing apparatus in the second layer; and
      in response to the performing of the second all-reduce communication and the third all-reduce communication, transmit a result of the second all-reduce communication and a result of the third all-reduce communication to the first information processing apparatus in the first layer via the first leaf switch.

2. The information processing apparatus according to claim 1, wherein:
   the performing of the second all-reduce communication is performed by using the result of the first all-reduce communication, and
   the performing of the third all-reduce communication is performed by using the result of the second all-reduce communication.

3. The information processing apparatus according to claim 1, wherein:
   the performing of the third all-reduce communication is performed by using the result of the first all-reduce communication, and
   the performing of the second all-reduce communication is performed by using the result of the third all-reduce communication.

4. The information processing apparatus according to claim 1, wherein the processor is configured to:
   generate a communication table to be used by each of the plurality of nodes in the multilayer full mesh system for communication; and
   transmit the generated communication table to at least any one of the plurality of nodes in the multilayer full mesh system.

5. An information processing method executed by a processor included in an information processing apparatus operable as one of a plurality of nodes in a multilayer full mesh system, the multilayer full mesh system including a plurality of spine switches, a plurality of leaf switches, and a plurality of information processing apparatuses, the method comprising:
   performing first all-reduce communication between the information processing apparatus and a first information processing apparatus via a first leaf switch, the first information processing apparatus being any one of the plurality of information processing apparatuses in a first layer, the first leaf switch being coupled to the information processing apparatus and the first information processing apparatus in the first layer, the first layer being any one of the plurality of layers;
   in response to a result of the first all-reduce communication, performing second all-reduce communication and third all-reduce communication, the second all-reduce communication being all-reduce communication between the information processing apparatus and a second information processing apparatus coupled to a second leaf switch included in the first layer same as the first leaf switch, the second information processing apparatus being one of the plurality of information processing apparatuses in the first layer, the third all-reduce communication being all-reduce communication between the information processing apparatus-in the first layer and a third information processing apparatus in a second layer different from the first layer via a spine switch, the third information processing apparatus being one of the plurality of information processing apparatuses in the second layer, the spine switch being coupled to both the first leaf switch in the first layer and a third leaf switch coupled to the third information processing apparatus in the second layer; and
   in response to the performing of the second all-reduce communication and the third all-reduce communication, transmitting a result of the second all-reduce communication and a result of the third all-reduce communication to the first information processing apparatus in the first layer via the first leaf switch.

6. The information processing method according to claim 5, wherein:
the performing of the second all-reduce communication is performed by using the result of the first all-reduce communication, and
the performing of the third all-reduce communication is performed by using the result of the second all-reduce communication.

7. The information processing method according to claim 5, wherein:
the performing of the third all-reduce communication is performed by using the result of the first all-reduce communication, and
the performing of the second all-reduce communication is performed by using the result of the third all-reduce communication.

8. The information processing method according to claim 5, the method comprising:
generating a communication table to be used by each of the plurality of nodes in the multilayer full mesh system for communication; and
transmitting the generated communication table to at least any one of the plurality of nodes in the multilayer full mesh system.

9. A non-transitory computer-readable recording medium storing a program that causes a processor included in an information processing apparatus to execute a process, the information processing apparatus being operable as one of a plurality of nodes in a multilayer full mesh system, the multilayer full mesh system including a plurality of layers, each layer including a plurality of spine switches, a plurality of leaf switches, and a plurality of information processing apparatuses, the process comprising:
performing first all-reduce communication between the information processing apparatus and a first information processing apparatus via a first leaf switch, the first information processing apparatus being any one of the plurality of information processing apparatuses in a first layer, the first leaf switch being coupled to the information processing apparatus and the first information processing apparatus in the first layer, the first layer being any one of the plurality of layers;
in response to a result of the first all-reduce communication, performing second all-reduce communication and third all-reduce communication, the second all-reduce communication being all-reduce communication between the information processing apparatus and a second information processing apparatus coupled to a second leaf switch included in the first layer same as the first leaf switch, the second information processing apparatus being one of the plurality of information processing apparatuses in the first layer, the third all-reduce communication being all-reduce communication between the information processing apparatus in the first layer and a third information processing apparatus in a second layer different from the first layer via a spine switch,
the third information processing apparatus being one of the plurality of information processing apparatuses in the second layer, the spine switch being coupled to both the first leaf switch in the first layer and a third leaf switch coupled to the third information processing apparatus in the second layer; and
in response to the performing of the second all-reduce communication and the third all-reduce communication, transmitting a result of the second all-reduce communication and a result of the third all-reduce communication to the first information processing apparatus in the first layer via the first leaf switch.

\* \* \* \* \*